United States Patent
Satoyama et al.

(10) Patent No.: US 11,144,202 B2
(45) Date of Patent: Oct. 12, 2021

(54) VOLUME MANAGEMENT APPARATUS, VOLUME MANAGEMENT METHOD, AND VOLUME MANAGEMENT PROGRAM

(71) Applicant: Hitachi, Ltd., Tokyo (JP)

(72) Inventors: Ai Satoyama, Tokyo (JP); Tomohiro Kawaguchi, Tokyo (JP); Takaki Matsushita, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 16/546,366

(22) Filed: Aug. 21, 2019

(65) Prior Publication Data
US 2020/0150866 A1    May 14, 2020

(30) Foreign Application Priority Data

Nov. 14, 2018  (JP) .............................. JP2018-214073

(51) Int. Cl.
*G06F 12/00* (2006.01)
*G06F 3/06* (2006.01)

(52) U.S. Cl.
CPC .......... *G06F 3/0604* (2013.01); *G06F 3/0641* (2013.01); *G06F 3/0689* (2013.01)

(58) Field of Classification Search
CPC .... G06F 3/0604; G06F 3/0641; G06F 3/0689; G06F 3/065; G06F 3/0605; G06F 3/0619; G06F 3/0688; G06F 3/06; G06F 3/0608; G06F 3/0659; G06F 3/0685; G06F 3/0649; G06F 3/0647; G06F 3/067
See application file for complete search history.

(56) References Cited

U.S. PATENT DOCUMENTS

| | | | | |
|---|---|---|---|---|
| 7,873,809 B2* | 1/2011 | Kano | ................... | G06F 16/221 711/216 |
| 2012/0311261 A1* | 12/2012 | Mizuno | ................ | G06F 3/0665 711/118 |
| 2014/0351545 A1* | 11/2014 | Nakajima | .............. | G06F 3/067 711/170 |
| 2015/0067286 A1* | 3/2015 | Colgrove | ............. | G06F 3/0688 711/162 |
| 2016/0210064 A1* | 7/2016 | Dornemann | ............ | G06F 3/064 |
| 2016/0259591 A1* | 9/2016 | Arikawa | ............... | G06F 3/0608 |
| 2017/0011062 A1* | 1/2017 | Zaveri | ................. | G06F 16/2358 |

FOREIGN PATENT DOCUMENTS

JP    2014-507693 A    3/2014

* cited by examiner

*Primary Examiner* — Shawn X Gu
(74) *Attorney, Agent, or Firm* — Mattingly & Malur, PC

(57) ABSTRACT

A storage system which stores a plurality of volumes and performs an I/O process on the volume includes a processor. The volume includes a first volume and a second volume which is copied from the first volume by snapshot. In a case where a write request is received, the processor determines whether a volume of a copy source related to a target volume of the write request is a volume of which a storage region is a valid region where a data amount reduction process is applied. Depending on a case where the volume of the copy source is a volume of which the storage region is a valid region or a case where the volume of the copy source is a volume of which the storage region is not a valid region, the processor switches and performs a process of creating the second volume related to the snapshot.

11 Claims, 23 Drawing Sheets

FIG. 5

| VOL# | VOL ATTRIBUTE | VOL CAPACITY | POOL # | VALID FLAG | VOL TYPE |
|---|---|---|---|---|---|
| 0 | PROVISION | 200GB | 0 | RESET | PVOL |
| 10 | WRITING | 200GB | 0 | SET | – |
| 20 | COMMON | 200GB | 0 | SET | |
| 30 | DUPLICATION INDEPENDENCE | 200GB | 0 | SET | |
| ... | ... | ... | ... | | |

| IN-VOL ADDRESS (901) | REFERENCE DESTINATION VOL # (902) | REFERENCE DESTINATION IN-VOL ADDRESS (903) | DATA SIZE (904) | REFERENCE DESTINATION VOL TYPE (905) |
|---|---|---|---|---|
| 0 | 100 | 10 | 1 | INDEPENDENCE |
| 10 | 100 | 20 | 5 | INDEPENDENCE |
| 20 | 200 | 50 | 10 | COMMON |
| ... | ... | ... | ... | ... |

FIG. 7

| IN-VOL ADDRESS | ALLOCATION FLAG | PAGE # |
|---|---|---|
| 0 | ALLOCATED | 0 |
| 100 | ALLOCATED | 1 |
| 200 | UNALLOCATED | - |
| ... | ... | |

| PAGE # | ALLOCATION FLAG | ALLOCATION DESTINATION VOL # | ALLOCATION DESTINATION IN-VOL ADDRESS |
|---|---|---|---|
| 0 | ALLOCATED | 0 | 100 |
| 1 | ALLOCATED | 1 | 200 |
| 2 | UNALLOCATED | - | - |
| ... | ... | ... | ... |

| PAGE # | IN-PAGE ADDRESS | ALLOCATION FLAG | IN-VOL ADDRESS | SUB-BLOCK SIZE |
|---|---|---|---|---|
| ... | ... | ... | ... | ... |

1301 / 1302 / 1303 / 1304 / 1305

VOLUME MANAGEMENT APPARATUS, VOLUME MANAGEMENT METHOD, AND VOLUME MANAGEMENT PROGRAM

CROSS-REFERENCE TO RELATED APPLICATION

The present application claims priority from Japanese application JP 2018-214073, filed on Nov. 14, 2018, the contents of which is hereby incorporated by reference into this application.

BACKGROUND OF THE INVENTION

1. Field of the Invention

The present invention relates to a technology of managing volumes which are created as a snapshot pair.

2. Description of the Related Art

The cost of a flash storage such as an all-flash array (AFA) is decided depending on the cost of a flash memory medium, but a bit cost of the flash memory is expensive of course. Then, in the all-flash array, the bit cost is lowered by reducing the amount of data to be stored in the flash memory using a data reduction amount function which is called a compression and deduplication function.

In addition, the market is increasingly demanding secondary use of data for analysis, testing, and development. Therefore, there is a need of a measure for providing a test environment enabling a simulation including cost effectiveness and operation. One of the measures is a snapshot function.

As a system of keeping a snapshot, there are a COW (Copy on Write) system and a ROW (Redirect on Write) system. In the COW system, data can be referred by making a snapshot volume (copy destination) point an original volume (copy source) after creating a volume pair of the snapshot. If the data of the original volume is overwritten, the old data before overwriting is evacuated and copied to a data storage region of the snapshot volume.

In the ROW system, after creating the volume pair of the snapshot, the original volume and the snapshot volume are set to point the data of a common region at the same time. If an overwriting request is received to the original volume, new data is stored in a unique region of the original volume, and the original volume is set to point new write data. In the ROW system, the old data at the time of overwriting request performed in the COW system is not necessary to be evacuated and copied. Therefore, a response performance is high at the time of the overwriting request compared to the COW system.

As a technique related to the snapshot, for example, the technique of JP 2014-507693 A is known.

SUMMARY OF THE INVENTION

In the AFA, many users use the compression and deduplication function in which the data amount is reduced for the purpose of reduction in the bit cost of an expensive flash memory. Generally, the deduplication function is a function of setting a reference destination of the plurality of logical addresses to a region where any data set among the plurality of data sets is stored, and reducing the data amount by erasing the remaining data sets in a case where it is detected that the contents of a plurality of data sets corresponding to a plurality of logical addresses are duplicated. If the compression and deduplication function is used, a processing performance is lowered as much as the process is performed. Then, in a case where the compression and deduplication function is not used, it is required to provide the environment of the secondary use of data for the users who value improvement in performance of works.

The invention has been made in view of the above problem, and an object thereof is to provide a technology which can make the volume related to a snapshot easily and appropriately managed.

In order to achieve the above object, in a volume management apparatus according to an aspect, a storage system which stores a plurality of volumes and performs an I/O process on the volume includes a processor unit. The volume includes a first volume and a second volume which is a volume copied from the first volume by snapshot. In a case where a write request is received, the processor unit determines whether a volume of a copy source related to a target volume of the write request is a volume of which a storage region is a valid region where a data amount reduction process is applied. Depending on a case where the volume of the copy source is a volume of which the storage region is a valid region or a case where the volume of the copy source is a volume of which the storage region is not a valid region, the processor switches and performs a process of creating the second volume related to the snapshot.

According to the invention, it is possible to easily and appropriately manage a volume related to a snapshot.

BRIEF DESCRIPTION OF THE DRAWINGS

FIG. 5 is a diagram illustrating a configuration of a VOL management table according to an embodiment;

FIG. 6 is a diagram illustrating a configuration of an address conversion table according to an embodiment;

FIG. 7 is a diagram illustrating a configuration of a page conversion table according to an embodiment;

FIG. 8 is a diagram illustrating a configuration of a page allocation management table according to an embodiment;

FIG. 9 is a diagram illustrating a configuration of a sub-block management table according to an embodiment;

DESCRIPTION OF THE PREFERRED EMBODIMENTS

Figure 1:
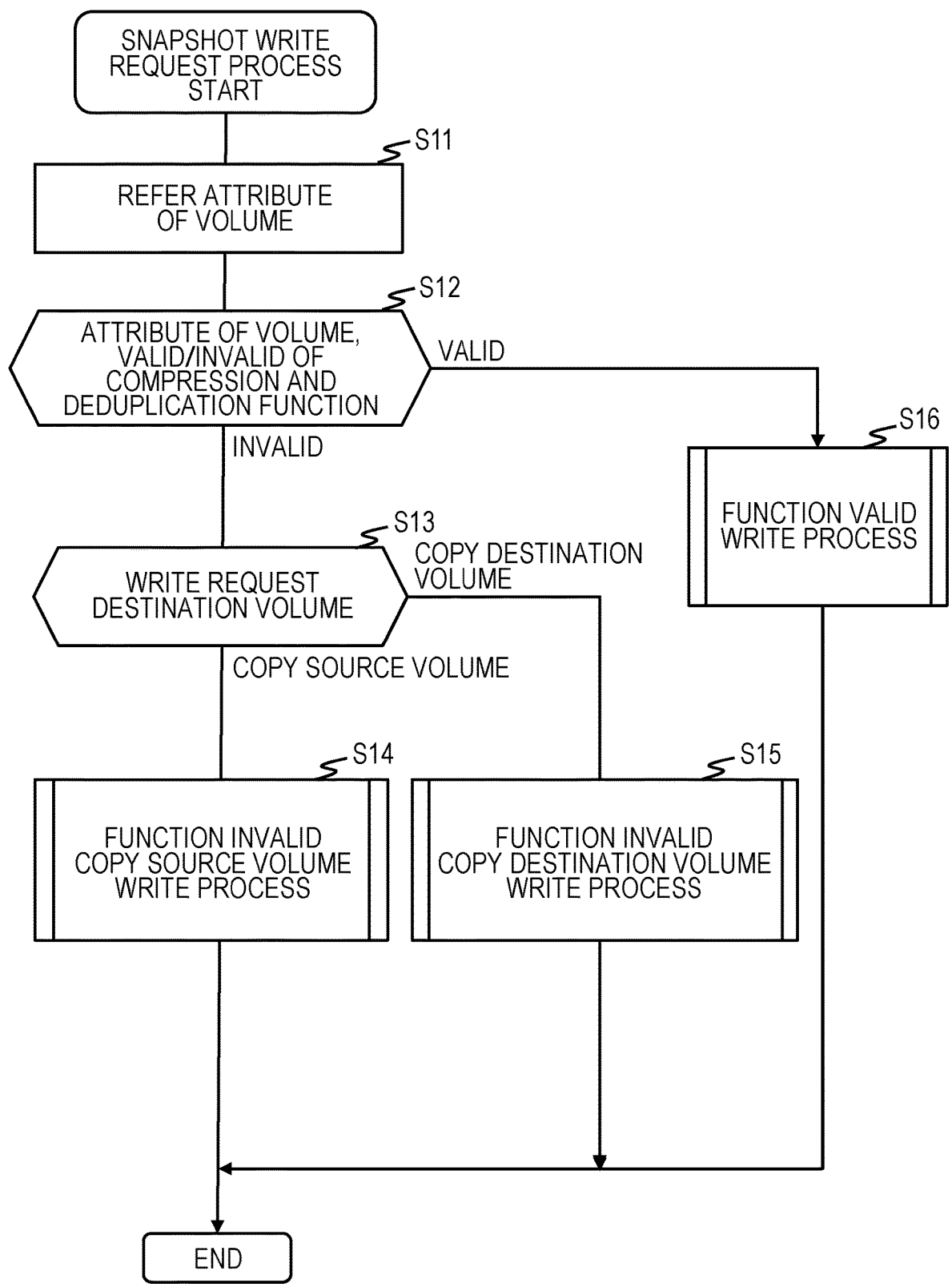
FIG. 1 is a flowchart schematically illustrating a volume management process according to an embodiment.

Embodiments will be described with reference to the drawings. Further, the embodiments described below do not limit the scope of the invention. Not all the elements and combinations thereof described in the embodiments are essential to the solution of the invention.

In the following description, "interface unit" may be configured by one or more interfaces. The one or more interfaces may be one or more communication interface devices of the same type (for example, one or more NICs (Network Interface Card)), or may be two or more communication interface devices of different types (for example, NIC and HBA (Host Bus Adapter)).

In addition, in the following description, a "memory unit" may be configured by one or more memories, or may typically be a main storage device. At least one memory in the memory unit may be a volatile memory, or may be a non-volatile memory.

In addition, in the following description, a "PDEV unit" may be one or more PDEVs, or may typically be an auxiliary storage device. The "PDEV" means a physical storage device, and typically is a non-volatile storage device such as an HDD (Hard Disk Drive) or an SSD (Solid State Drive).

In addition, in the following description, a "storage unit" is at least one (typically at least the memory unit) of the memory unit and at least a part of the PDEV unit.

In addition, in the following description, a "processor unit" is configured by one or more processors. At least one processor is typically a microprocessor such as a CPU (Central Processing Unit), or may be other types of processors such as a GPU (Graphics Processing Unit). At least one processor may be configured by a single core, or multiple cores.

In addition, at least one processor may be a processor such as a hardware circuit (for example, FPGA (Field-Programmable Gate Array) or an ASIC (Application Specific Integrated Circuit)) which performs some or all of the processes in a broad sense.

In addition, in the following description, information for obtaining an output with respect to an input will be described using an expression of "AAA table". The information may be data of any structure, or may be a learning model such as a neural network in which an output with respect to an input is generated. Therefore, the "AAA table" may be referred to as "AAA information".

In addition, in the following description, the configuration of each table is given as merely exemplary. One table may be divided into two or more tables, or all or some of two or more tables may be configured by one table.

In addition, in the following description, a process may be described to be performed by a "program". The program is performed by the processor unit, and a designated process is performed appropriately using a storage unit and/or an interface unit. Therefore, the subject of the process may be the processor unit (or a device such as a controller which includes the processor unit).

The program may be installed in a device such as a calculator, or may be, for example, a program distribution server or a (for example, non-temporary) recording medium which can be read by a calculator. In addition, in the following description, two or more programs may be expressed as one program, or one program may be expressed as two or more programs.

In addition, in the following description, a "calculator system" is a system which includes one or more physical calculators. The physical calculator may be a general purpose calculator or a dedicated calculator. The physical calculator may serve as a calculator (for example, a server calculator) which issues an I/O (Input/Output) request, or may serve as a calculator (for example, a storage device) which inputs or outputs data in response to an I/O request. In other words, the calculator system may be at least one of a server system which is one or more server calculators issuing the I/O request, and one or more storage systems which input or output data in response to the I/O request. In at least one physical calculator, one or more virtual calculators (for example, VM (Virtual Machine)) may be performed. The virtual calculator may be calculator which issues an I/O request, or may be a calculator which inputs or outputs data in response to an I/O request.

In addition, the calculator system may be a distribution system which is configured by one or more (typically, plural) physical node devices. The physical node device is a physical calculator.

In addition, SDx (Software-Defined anything) may be established in the physical calculator (for example, a node device) or the calculator system which includes the physical calculator by performing predetermined software in the physical calculator. Examples of the SDx may include an SDS (Software Defined Storage) or an SDDC (Software-defined Datacenter). For example, the storage system as an SDS may be established by a general-purpose physical calculator which performs a software having a storage function.

In addition, at least one physical calculator (for example, a storage device) may be configured by one or more virtual calculators as a host system and a virtual calculator as the storage controller (typically, a device which inputs or outputs data with respect to the PDEV unit in response to the I/O request) of the storage system. In other words, at least one such physical calculator may have both a function as at least a part of the host system and a function as at least a part of the storage system.

In addition, the calculator system (typically, the storage system) may include a redundant configuration group. The redundant configuration may be configured by Erasure Coding, RAIN (Redundant Array of Independent Nodes) and a plurality of node devices such as mirroring between nodes, or may be configured by a single calculator (for example, the node device) such as one or more RAID (Redundant Array of Independent (or Inexpensive) Disks) groups as at least a part of the PDEV unit.

In addition, a "data set" in the following description is a lump of logical electronic data viewed from a program such as an application program, and may include any one of a record, a file, a key value pair, and a tuple for example.

In addition, in the following description, identification numbers are used as identification information of various types of targets. Identification information (for example, an identifier containing alphanumeric characters and symbols) other than the identification number may be employed.

In addition, in the following description, in a case where similar types of elements are described without distinction, the reference symbols (or common symbol among the reference symbols) may be used. In a case where the similar elements are described distinctively, the identification numbers (or the reference symbols) of the elements may be used. For example, in a case where "page" (a unit of storage region) is described without any particular distinction, it will be denoted as "page 51". In a case where each page is described distinctively, it will be denoted with "page #0" and "page #1" using the page number, or will be denoted with "independent page 51P" and "common page 51C" using the reference symbol.

First, the outline of a volume management process in the calculator system according to a first embodiment will be described.

FIG. 1 is a flowchart schematically illustrating the volume management process according to an embodiment.

Herein, a storage system 200 as an example of a volume management apparatus takes a snapshot of the original volume (a copy source volume: a first volume) according to a user's operation for example, and creates a snapshot volume (a copy destination volume: a second volume) which is the snapshot of the original volume. With this configuration, the original volume and the snapshot volume become a snapshot pair. Then, in the storage system 200, the original volume and the snapshot volume are set in a suspend state for example. The original volume and the snapshot volume each are assumed to be in an I/O enabled state by a host calculator (for example, a server system 201 (see FIG. 2)).

If a write request to the volume stored in the storage system 200 is received from the host calculator, the storage system 200 refers a valid flag of a VOL management table (see FIG. 5) (S11). Next, the storage system 200 determines, from the valid flag, whether a compression and deduplication function is valid in the original volume of the snapshot pair containing a volume (referred to as a target volume in the description of the drawing) at the write request destination (S12). Herein, the expression "the compression and deduplication function is valid" indicates that the compression and deduplication function can be applied to a storage region of the volume (that is, the storage region is a valid region).

As a result of the determination, in a case where the compression and deduplication function is valid in the original volume (S12: Valid), the storage system 200 performs a write process (a function valid write process: see FIG. 23) on the volume in which the compression and deduplication function is valid (S16), and the process ends.

On the other hand, in a case where the compression and deduplication function is invalid (S12: Invalid), the storage system 200 determines the type of the target volume (S13). As a result of the determination, in a case where the type of the target volume is a copy source volume of the snapshot pair (S13: copy source volume), the storage system 200 performs a write process (a function invalid copy source volume write process: see FIG. 18) on the copy source volume in which the compression and deduplication function is invalid (S14), and the process ends. On the other hand, in a case where the type of the target volume is a copy destination volume (snapshot volume) (S13: copy destination volume), a write process (a function invalid copy destination volume write process) is performed on the copy source volume in which the compression and deduplication function is invalid (S15), and the process ends.

In addition, in a case where the storage system 200 receives a read request from the host calculator, the storage system 200 refers an address conversion table (see FIG. 10) regardless of the attribute and the type of the volume of a read request destination, and reads data from a pool region to which a target place of the read request is pointed.

Further, the above example is described about a case where the compression and deduplication function can be set valid in a unit of volume. For example, the compression and deduplication function may be set valid in a unit of a partial region of the volume. In this case, a valid flag which indicates whether the compression and deduplication function is valid may be managed in a unit of a partial region of the volume (for example, block).

In this embodiment, the description will be given about a case where the compression and deduplication function is set valid in a unit of volume.

Next, the configuration of a calculator system 100 will be described.

Figure 2:
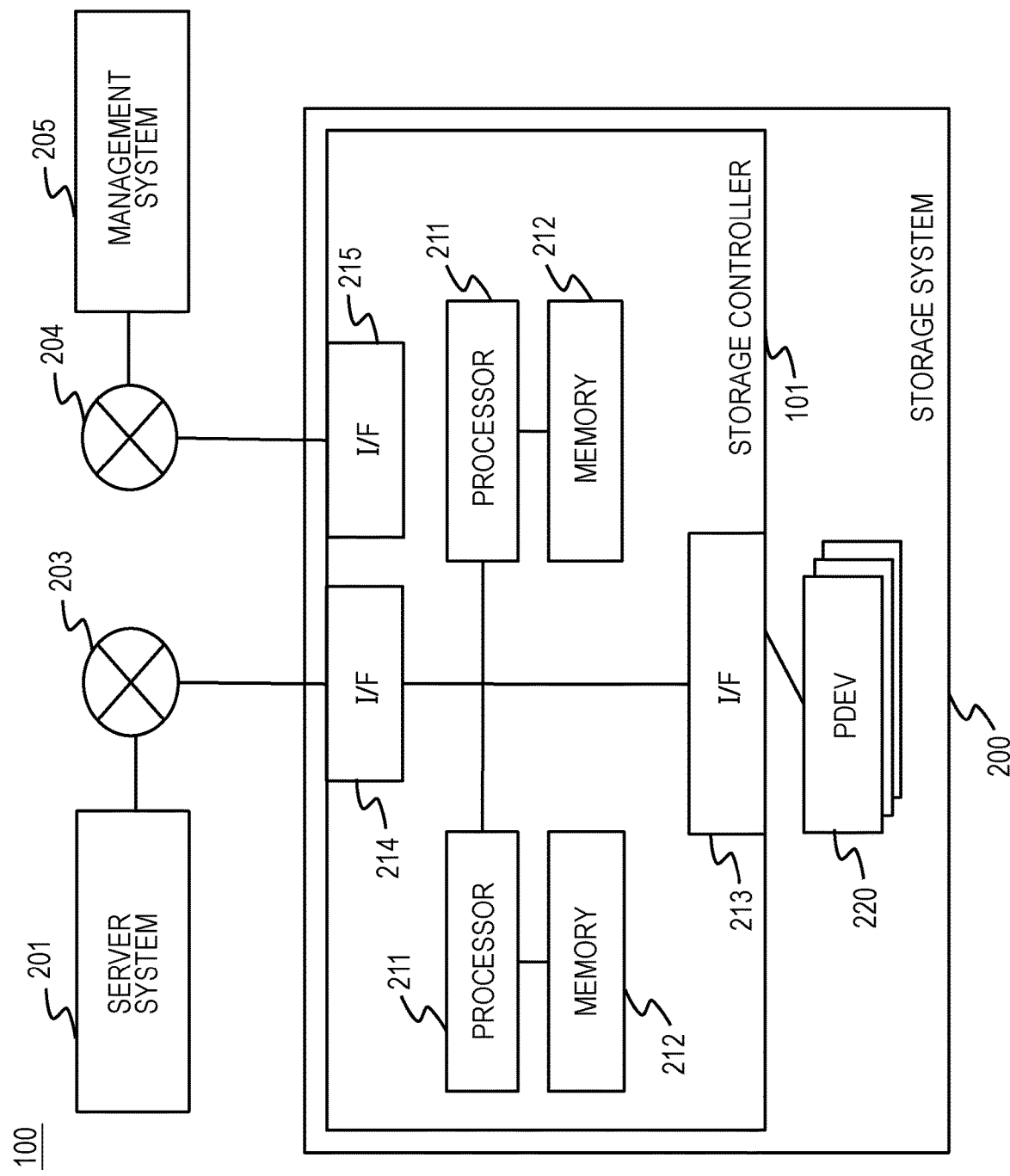
FIG. 2 is a diagram illustrating a configuration of a calculator system according to an embodiment.

FIG. 2 is a diagram illustrating a configuration of the calculator system according to an embodiment.

The calculator system 100 includes the server system 201, a management system 205, and the storage system 200 as an example of the volume management apparatus. The server system 201 and the storage system 200 are connected through a network 203. The network 203 may be, for example, an FC (Fibre Channel) network. In addition, the management system 205 and the storage system 200 are connected through a network 204. The network 204 may be, for example, an IP (Internet Protocol) network. Further, the network 203 and the network 204 may be the same communication network.

In the server system 201, an application which uses a volume stored in the storage system 200 is performed to transmit an I/O request (the write request or the read request) designated with an I/O destination (for example, a logical volume number such as LUN (Logical Unit Number), a logical address such as LBA (Logical Block Address)) to the storage system 200. The management system 205 manages the storage system 200.

The storage system 200 is an example of a controller which includes the processor unit. The storage system 200 has the compression function and the deduplication function as functions for performing a data amount reduction process. In addition, the storage system 200 has a volume copy function as a function of virtually copying a logical volume while the data amount is reduced.

The storage system 200 includes one or more PDEVs 220 and a storage controller 101 which is connected to the PDEV 220.

The PDEV 220 is an example of a storage device such as an HDD or an SSD (Solid State Drive).

The storage controller 101 includes an I/F 214, an I/F 215, an I/F 213, a memory 212, and a processor 211. In this embodiment, a set of the memory 212 and the processor 211 is configured in redundancy in the storage controller 101.

Herein, the I/F 214, the I/F 215, and the I/F 213 are examples of the interface unit. The memory 212 is an example of the storage unit. The processor 211 is an example of the processor unit.

The processor 211 performs various types of processes by performing a program. For example, the processor 211 performs a write process of data, a read process, and a compression and expansion process of data. Further, the processor 211 may include a hardware circuit which performs compression and expansion.

The I/F 214 is a communication interface device which relays exchanging data between the server system 201 and the storage controller 101. The I/F 215 is a communication interface device which relays exchanging data between the management system 205 and the storage controller 101. The I/F 213 is a communication interface device which relays exchanging data between the plurality of PDEVs 220 and the storage controller 101.

The memory 212 stores a program (for example, a volume management program) performed by the processor 211 and data used by the processor 211.

Figure 3:
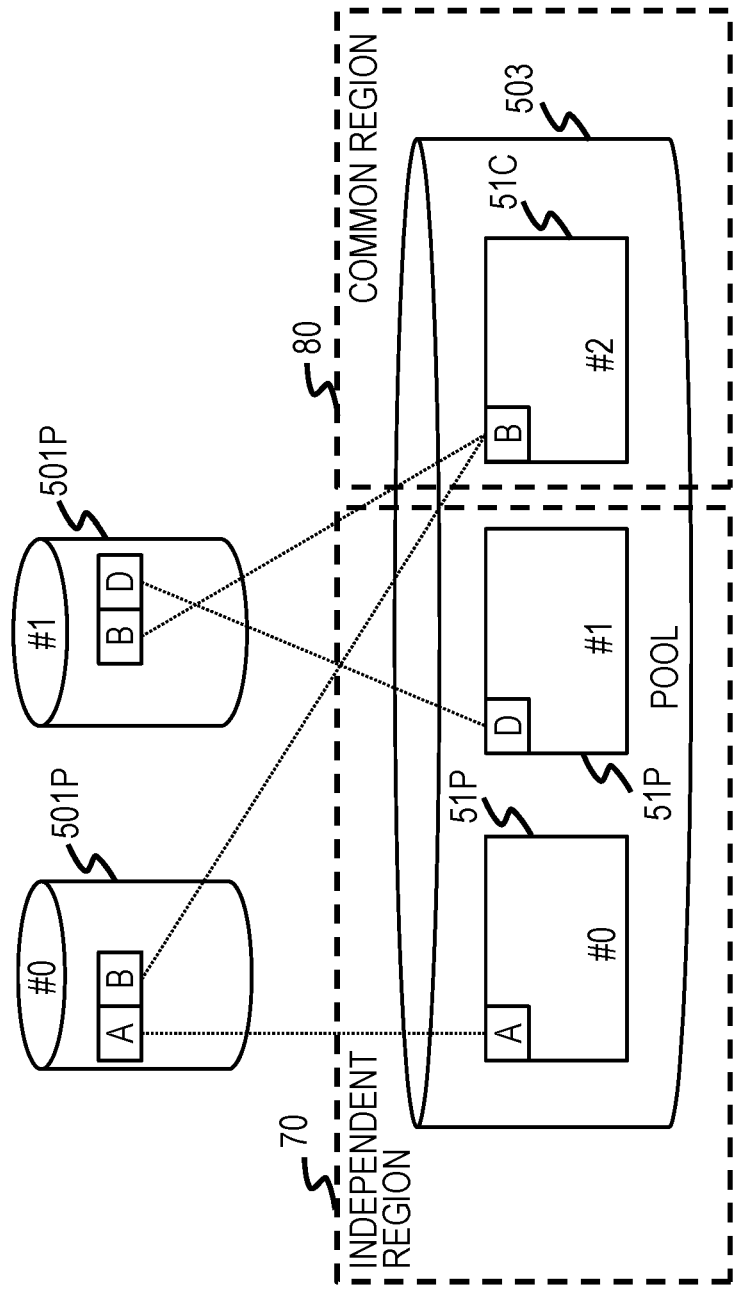
FIG. 3 is a diagram for describing a deduplication operation according to an embodiment.

FIG. 3 is a diagram for describing a deduplication operation according to an embodiment.

In the storage system 200, the logical storage region is configured by a plurality of layers. Specifically, in the storage system 200, for example, there are an upper layer which is configured by a virtual logical volume (virtual volume) 501 (501P, etc.) in conformity to thin provisioning, and a lower layer which includes a pool 503 configured by a plurality of pages (an example of partial region) which can be allocated to the virtual volume. Herein, the layer will be called "upper" as it comes close to the host device (for example, the server system 201) which uses data, and will be called "lower" as it comes close to the PDEV 220.

A logical volume 501 is a virtual logical volume in conformity to a capacity virtualization technology (typically, thin provisioning). For example, the logical volume 501 includes a provision volume 501P which is a logical volume recognizable from the host device. The unallocated (empty) page 51 (51P, 51C, etc.) in the pool 503 is allocated to the logical address of a write destination of the logical volume 501.

In this embodiment, in the storage system 200, the logical storage regions are prepared as a common region 80 which is a space where the data set duplicated among the plurality of volumes is stored, and an independent region 70 which is a space where the data set unduplicated among the plurality of volumes is stored. In other words, the logical address space in the storage system 200 is logically separated into the common region 80 and the independent region 70.

In order to perform the deduplication, the storage controller 101 performs a duplication determination process to determine whether the data set to be targeted (referred to as a target data set in the description of the same drawing) according to the write request with the write destination of a provision volume #0 is a data set (duplication data set) which is duplicated with any one or more data sets. The duplication determination process may be any one of a process (in-process) performed in synchronization with the process of the write request and a process (post-process) performed in asynchronization with the process of the write request after the target data set according to the write request is stored.

As a result of the duplication determination process, if the target data set is a data set (an independent data set: for example, the data set A of FIG. 3) which is not duplicated with any of the data sets, the storage controller 101 sets the storing destination of the data set A to the page #0 which belongs to, for example, the independent region 70 and corresponds to the provision volume #0. The page belonging to the independent region 70 may be referred to as "independent page". In the example of FIG. 3, each of the pages #0 and #1 is the independent page 51P.

On the other hand, as a result of the duplication determination process, if the target data set is a data set (a duplication data set: for example, the data set B of FIG. 3) which is duplicated with any one or more data sets, the storage controller 101 sets the storing destination of the data set B to a page #2 which belongs to the common region 80. The page #2 is directly or indirectly referred from the respective write destinations (the provision volumes #0 and #1) of the data set B. The page belonging to the common region 80 may be referred to as "common page" hereinafter. In the example of FIG. 3, the page #2 is the common page 51C.

In a case where the duplication determination process is a post-process, the storage controller 101 stores the data set B to each of the independent pages #0 and #1 respectively allocated to the provision volumes #0 and #1 in the write process, copies the data set B of the independent page #0 or #1 to a common page #2, and erases the data set B from each of the independent pages #0 and #1.

Next, the configuration of the memory 212 will be described in detail.

Figure 4:
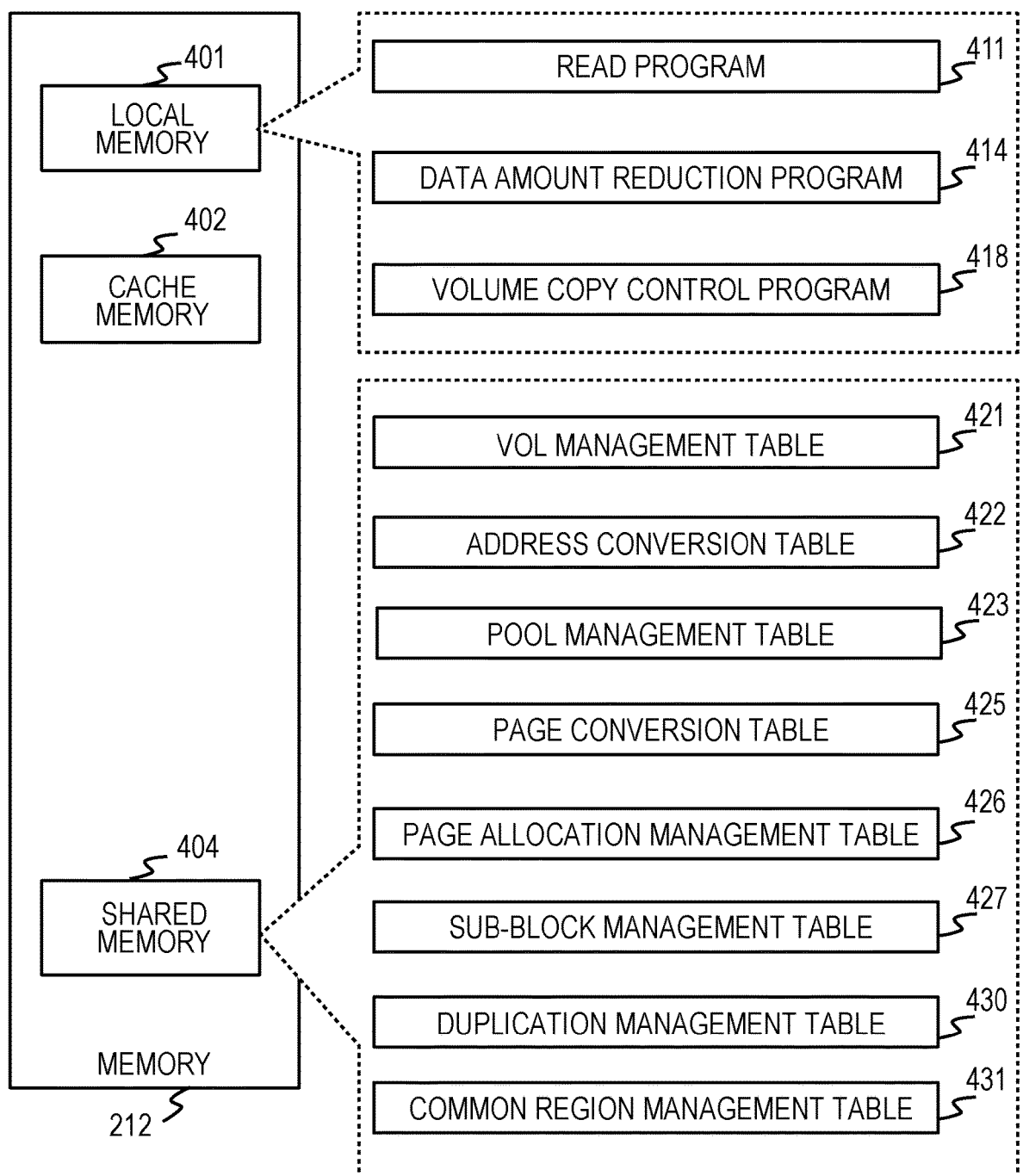
FIG. 4 is a diagram illustrating a configuration of a memory according to an embodiment.

FIG. 4 is a diagram illustrating a configuration of a memory according to an embodiment.

The memory 212 includes memory regions of a local memory 401, a cache memory 402, and a shared memory 404. At least one of these memory regions may be configured by an independent memory.

The local memory 401 is used by the processor 211 which belongs to the same group as the memory 212 which includes the local memory 401. In the local memory 401, a read program 411, a data amount reduction program 414, and a volume copy control program 418 are stored. These programs correspond to the volume management program. These programs will be described below.

In the cache memory 402, the data set written or read with respect to the PDEV 220 is stored temporarily.

The shared memory 404 is used by both the processor 211 belonging to the same group as the memory 212 which includes the shared memory 404, and the processor 211 belonging to a different group. In the shared memory 404, a VOL management table 421, an address conversion table 422, a pool management table 423, a page conversion table 425, a page allocation management table 426, a sub-block management table 427, a duplication management table 430, and a common region allocation management table 431 are stored as various types of management information.

The pool management table 423 is a table which stores information related to the pool 503. The pool management table 423 holds information of, for example, pool # (the number of the pool 503) for every pool 503, RG # (the number of one or more RAID groups based on the pool 503), a pool capacity (the capacity of the pool 503), and a pool usage (the capacity used in the pool capacity (typically, a total amount of allocated pages in the pool 503)). The details of tables other than the pool management table 423 will be described below.

Next, the VOL management table will be described in detail.

FIG. 5 is a diagram illustrating a configuration of the VOL management table according to an embodiment.

The VOL management table 421 holds information related to VOL (volume). Herein, "VOL" includes a logical volume which is provided to the server system 201 such as the provision volume 501P, and a logical volume which is not provided to the server system 201 such as a common volume 501C and a writing volume 502 (see FIGS. 12 and 14). In addition, a provision volume 501S to be newly provided to the server system 201 by the volume copy is also included to "VOL".

The VOL management table 421 has an entry for each VOL. Each entry includes fields of VOL #801, a VOL attribute 802, a VOL capacity 803, pool #804, a valid flag 805, and a VOL type 806. Hereinafter, the description will be given by taking an entry corresponding to one VOL (referred to as "target VOL") as an example.

In VOL #801, the number of the target VOL (identification number: volume number: VOL #) is stored. In the VOL attribute 802, the attribute information of the target VOL is stored. As the attribute, for example, there are "provision" indicating that VOL is a provision volume, "writing" indicating a writing volume, "common" indicating a common volume, and "duplication independence" indicating a provision volume of old version by the volume copy. In the VOL capacity 803, the capacity information of the target VOL is stored. In pool #804, the number information of the pool 503 associated with the target VOL is stored. In the valid flag 805, there is stored a valid flag indicating whether the compression and the deduplication are valid (valid region) in the storage region of the target VOL. In a case where the compression and the deduplication are valid, the valid flag is "Set". In a case where the compression and the deduplication are invalid, the valid flag is "Reset". In the VOL type 806, the type (PVOL (Primary VOL: the first volume) of the target VOL at the time of taking the snapshot (when the snapshot is generated), or an SVOL (Secondary VOL: the second volume)) is stored.

Next, the address conversion table will be described in detail.

FIG. 6 is a diagram illustrating a configuration of the address conversion table according to an embodiment.

The address conversion table 422 holds information related to a relation between the logical address of the reference source and the logical address of the reference destination. The address conversion table 422 is provided for each logical volume 501 (the logical volume of a layer 1 described below).

The address conversion table 422 has an entry for each block 601 of the logical volume 501. Each entry includes fields of an in-VOL address 901, a reference destination VOL #902, a reference destination in-VOL address 903, a data size 904, and a reference destination VOL type 905. Hereinafter, the description will be given about an example of the entry corresponding to one block 601 (referred to as "target block").

In the in-VOL address 901, the logical address (for example, the logical volume of the head) of the target block in the logical volume 501 is stored. In the reference destination VOL #902, the number (VOL #) of the VOL (the writing volume or the common volume) of the reference destination of the target block is stored. In the reference destination in-VOL address 903, the corresponding logical address (the logical address in the VOL of the reference destination) in the VOL of the reference destination of the target block is stored. In the data size 904, the size of the data set with the target block as the write destination (the size after compression in a case where the compression is performed) is stored. In the reference destination VOL type 905, the type (the reference destination VOL type) of the VOL of the reference destination of the target block is stored. The reference destination VOL type includes "Independence" indicating that the VOL of the reference destination is the writing volume, and "Common" indicating that the VOL of the reference destination is the common volume, and "Duplication independence" indicating that the VOL of the reference destination is the duplication independent volume.

Next, the page conversion table will be described in detail.

FIG. 7 is a diagram illustrating a configuration of the page conversion table according to an embodiment.

The page conversion table 425 stores a region in the logical volume 501 or the writing volume 502 (for example, the block 601 as many as the size of the page 51) and information related to a relation with the page 51. The page conversion table 425 is provided for each of the logical volume 501 and the writing volume 502.

The page conversion table 425 includes an entry for each region in the logical volume 501 or the writing volume 502. Each entry includes fields of an in-VOL address 1101, an allocation flag 1102, and a page #1103. Hereinafter, the description will be given by taking an entry corresponding to one region (referred to as "target region") as an example.

In the in-VOL address 1101, the logical address (for example, the logical address of the head) of the target region is stored. In the allocation flag 1102, the allocation flag indicating whether the page 51 is allocated to the target region is stored. In a case where the page 51 is allocated to the target region, the allocation flag is set to "Allocated". In a case where the page 51 is not allocated to the target region, the allocation flag is set to "Unallocated". In the page number 1103, the number (page #) of the page 51 allocated to the target region is stored.

Next, the page allocation management table will be described in detail.

FIG. 8 is a diagram illustrating a configuration of the page allocation management table according to an embodiment.

The page allocation management table 426 is provided for each pool 503. The page allocation management table 426 stores information related to a relation between the page 51 and an allocation destination. The page allocation management table 426 has an entry for each page 51. Each entry includes fields of a page #1201, an allocation flag 1202, an allocation destination VOL #1203, and an allocation destination in-VOL address 1204. The description will be given about an example of the entry corresponding to one page 51 (referred to as "target page").

In the page #1201, the number (page #) of the target page in the pool 503 is stored. In the allocation flag 1202, the allocation flag indicating whether the target page is allocated is stored. In a case where the target page is allocated to the target region, the allocation flag is set to "Allocated". In a case where the target page is not allocated to the target region, the allocation flag is set to "Unallocated". In the allocation destination VOL #1203, the number (the allocation destination VOL #) of the VOL (the logical volume 501 or the writing volume 502) of the allocation destination of the target page is stored. In the allocation destination in-VOL address 1204, the logical address (for example, the head logical address) of the region of the allocation destination in the allocation destination VOL of the target page is stored.

Next, the sub-block management table will be described in detail.

FIG. 9 is a diagram illustrating a configuration of the sub-block management table according to an embodiment.

The sub-block management table 427 is provided for each writing volume 502. The sub-block management table 427 stores information related to a sub-block 602 (see FIG. 13). The sub-block management table 427 has an entry for each sub-block 602. Each entry includes fields of a page #1301, an in-page address 1302, an allocation flag 1303, an in-VOL address 1304, and a sub-block size 1305. Hereinafter, the description will be given about an example of the entry corresponding to one sub-block 602 (referred to as "target sub-block").

In the page #1301, the number (page #) of the page 51 containing the target sub-block is stored. In the in-page address 1302, the logical address of the target sub-block in the page 51 is stored. In the allocation flag 1303, there is stored a flag indicating whether the target sub-block is allocated (that is, whether the target sub-block is in use). In a case where the target sub-block is allocated, the flag is set to "Allocated". In a case where the target sub-block is not allocated, the flag is set to "Unallocated". In the in-VOL address 1304, the logical address (the logical address of the region in the writing volume 502) of the allocation destination of the target sub-block is stored. In the sub-block size 1305, the size of the target sub-block (the size of the data set after compression which is stored in the target sub-block) is stored. Further, the value of the in-page address 1302 and the value of the in-VOL address 1304 may be equal.

Next, the duplication management table will be described in detail.

Figure 10:
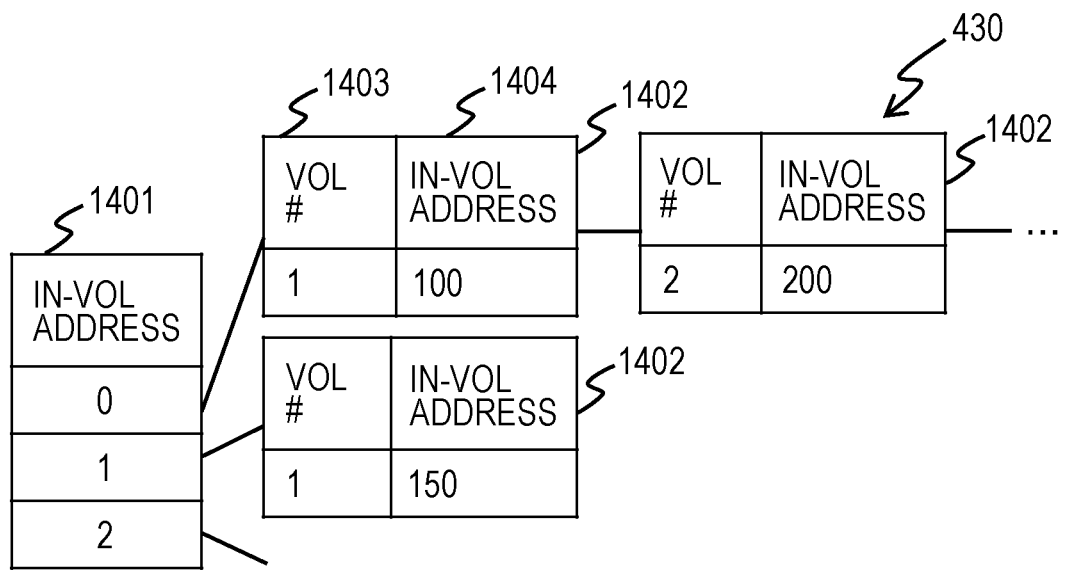
FIG. 10 is a diagram illustrating a configuration of a duplication management table according to an embodiment.

FIG. 10 is a diagram illustrating a configuration of the duplication management table according to an embodiment.

The duplication management table 430 stores information related to the position (logical address) of the duplication data set. The duplication management table 430 includes an in-VOL address 1401 for each of the plurality of common blocks 601C which form, for example, the common volume 501C. In the in-VOL address 1401, the logical address of a common block 601C is stored. In addition, in the duplication management table 430, an entry 1402 corresponding to the block of the reference source is associated, for example, in a queue format to the address of the common block 601C where the reference source exists. The entry 1402 of the reference source includes VOL #1403 and an in-VOL address 1404. In VOL #1403, the number of the logical volume 501 containing the block 601 of the reference source is stored. In the in-VOL address 1404, the logical address of the block 601 of the reference source is stored.

Next, a common region allocation management table will be described in detail.

Figure 11:
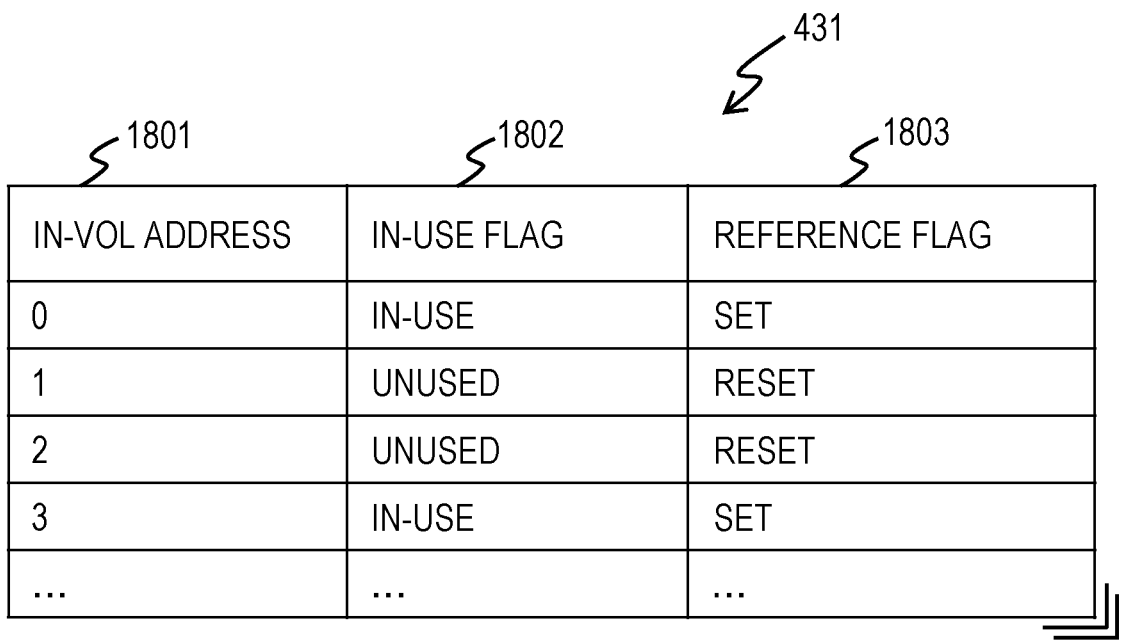
FIG. 11 is a diagram illustrating a configuration of a common region allocation management table according to an embodiment.

FIG. 11 is a diagram illustrating a configuration of the common region allocation management table according to an embodiment.

Figure 14A:
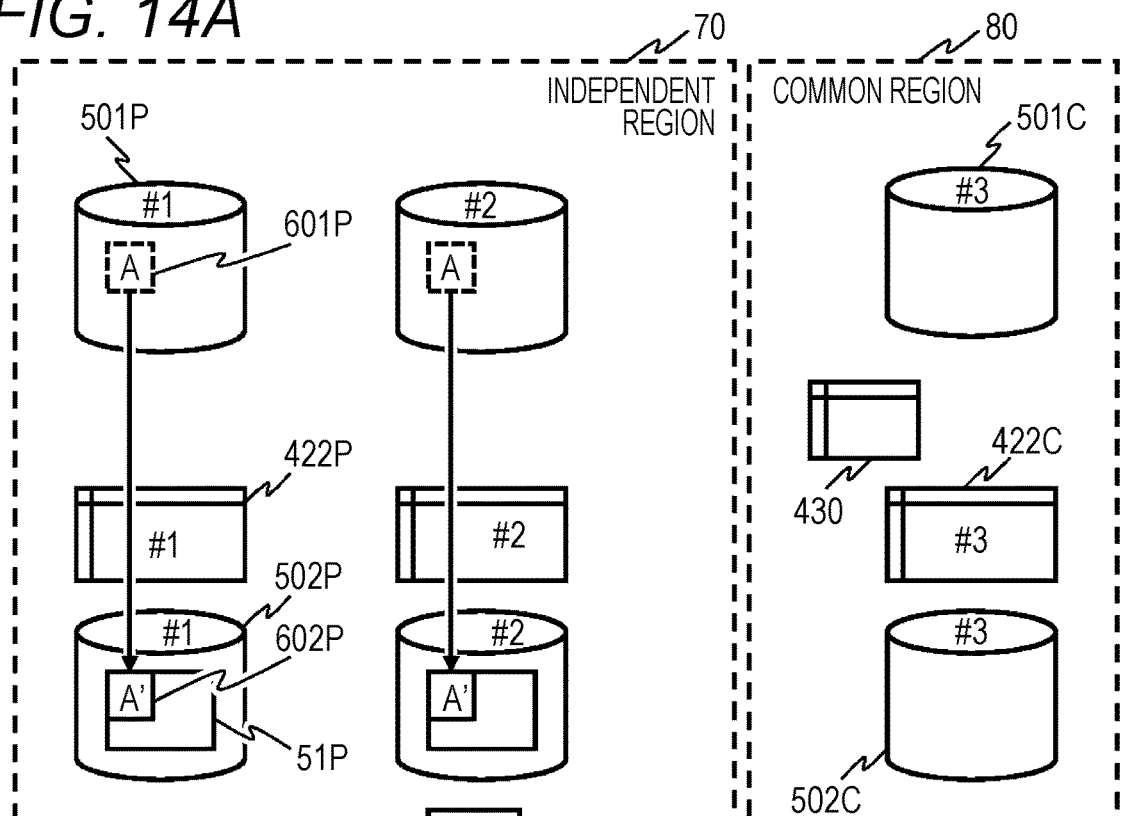
FIGS. 14A and 14B are diagrams for describing a deduplication process according to an embodiment.
Figure 14B:
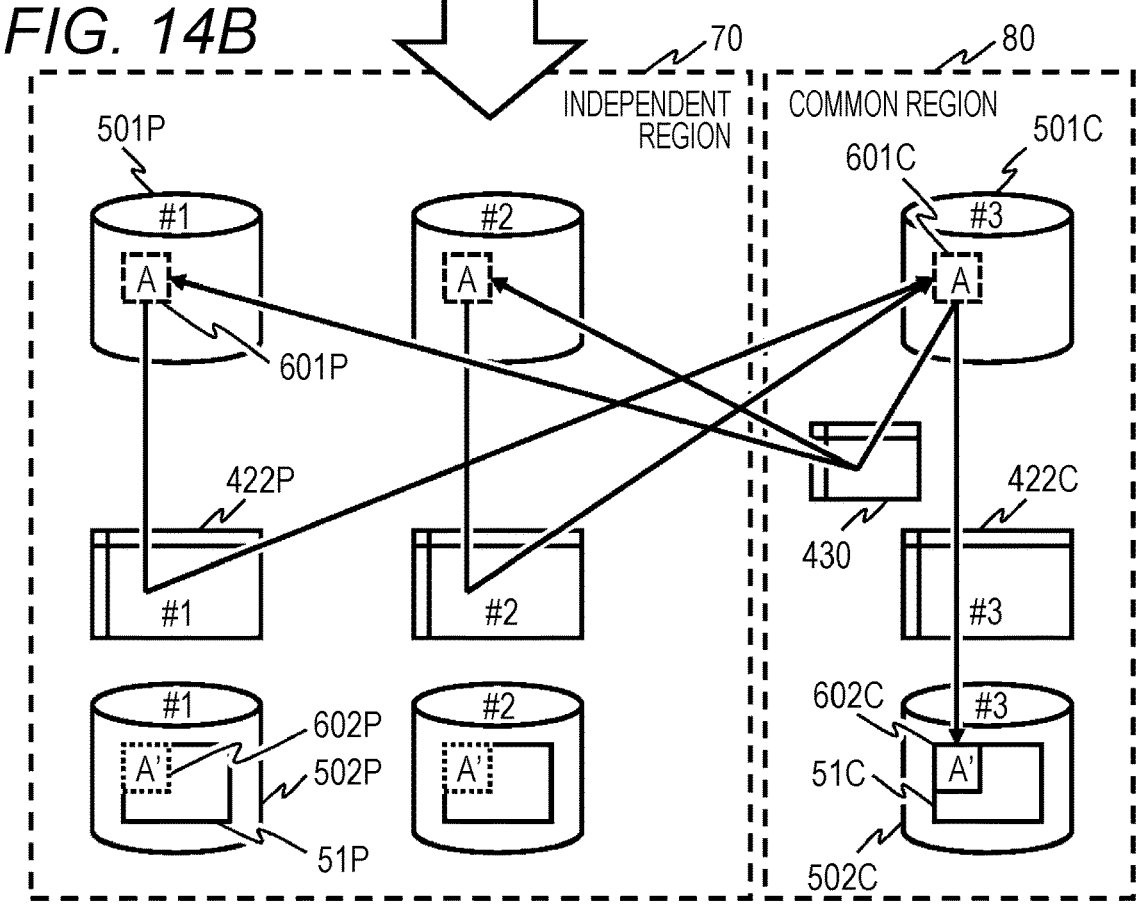

The common region allocation management table 431 is provided for each common volume 501C (see FIGS. 14A and 14B). The common region allocation management table 431 stores information related to an empty situation of the common volume 501C. The common region allocation management table 431 has an entry for each of the plurality of common blocks 601C which form, for example, the common volume 501C (see FIGS. 14A and 14B). Each entry includes fields of an in-VOL address 1801, an in-use flag 1802, and a reference flag 1803. Hereinafter, the description will be given about an example of the entry corresponding to one common block 601C (referred to as "target block").

In the in-VOL address 1801, the logical address of the target block is stored. In the in-use flag 1802, a flag (in-use flag) indicating whether the target block is in use or not is stored. In this embodiment, in a case where the target block is in use, the in-use flag is set to "In-use". In a case where the target block is not in use, the in-use flag is set to "Unused". Herein, in a case where the in-use flag is "In-use", it means that the page 51 is directly (not through the writing volume) or indirectly (through the writing volume) allocated to the target block. On the other hand, in a case where the flag is "Unused", it means that the page 51 is not allocated to the target block (that is, empty).

In the reference flag 1803, a flag (reference flag) indicating whether the common volume 501C is referred is stored. In a case where there are one or more blocks 601 serving as one or more reference sources for the target block, the reference flag is set to "Set", and if not, set to "Reset".

Next, a storage hierarchy of the storage system 200 will be described.

Figure 12:
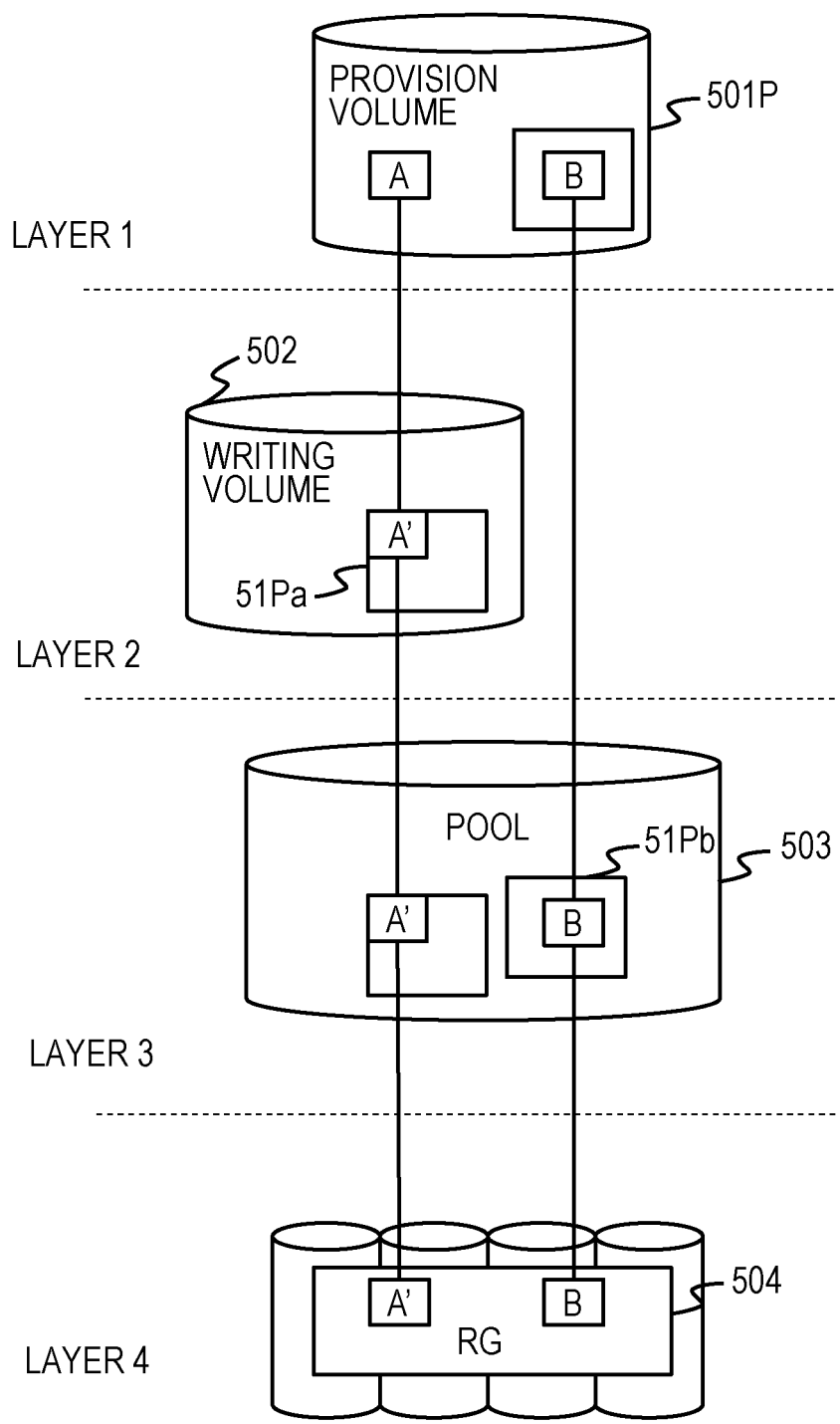
FIG. 12 is a diagram for describing a storage hierarchy of a storage system according to an embodiment.

FIG. 12 is a diagram for describing the storage hierarchy of the storage system according to an embodiment.

Herein, in the following description, the layer will be called an upper level as the layer comes close to the host device which uses data, and called a low level as the layer comes close to the PDEV. Then, an n-th layer (n is a natural number) will be called "layer n". The number "n" indicates that the layer comes close to the upper level as the value is small.

In the storage hierarchy in the storage system 200, there is a storage hierarchy from the layer 1 to the layer 4.

The provision volume 501P is provided as the logical storage region of the layer 1 (an example of the upper layer in FIG. 3). The provision volume 501P is provided to the server system 201. In other words, the provision volume 501P is a logical volume which can be visible from the server system 201. In addition, in this embodiment, there is a common volume which is a logical volume belonging to the common region 80 (described below) as the logical storage region of the layer 1. The common volume is not provided to the server system 201. In other words, the common volume is a logical volume which is invisible from the server system 201. Further, there is an independent volume which is a logical volume belonging to the independent region 70 (described below) as the logical storage region of the layer 1. The independent volume is not provided to the server system 201. In other words, the independent volume is a logical volume which is invisible from the server system 201.

There is the writing volume 502 as the logical storage region as the layer 2. The writing volume 502 is a logical volume for writing. Any one logical volume 501 (for example, the provision volume 501P, etc.) is associated with one writing volume 502. On the contrary, one or plural writing volumes 502 are associated with one logical volume 501. Therefore, the writing volume 502 (the logical storage region of the layer 2) and the logical volume 501 (the logical storage region of the layer 1) are in a one-to-one relation or in a one-to-many relation. Further, in this embodiment, in order to simplify the description, the writing volume 502 and the logical volume 501 are assumed to be in a one-to-one relation.

As the logical storage region of the layer 3 (an example of the lower layer described using FIG. 3), there is the pool 503. The pool 503 is a logical storage region based on one or more RGs 504. The pool 503 is configured by a plurality of pages 51. Further, the pool 503 may include a storage region based on an external storage resource of the storage system 200 instead of or in addition to at least one RG 504.

As the logical storage region of the layer 4, there is RG 504. RG 504 is a space (storage region) of the RAID group which is configured by a plurality of PDEVs 220.

A part of the provision volume 501P illustrated in FIG. 12 is at least a part among two or more provision volumes 501P, and a region (referred to as "valid region") in which a data amount reduction function of at least one of the compression and the deduplication is validated. On the other hand, the region other than the valid region among two or more provision volumes 501P is a region (referred to as "invalid region") in which the data reduction function of the compression and the deduplication is invalidated.

In a case where the write destination of the data set A of the write target is a valid region (herein, the compression is valid), the storage controller 101 compresses the data set A of the write target, and writes the compressed data set A' to the page 51Pa (page 51Pa (independent page) allocated to a page of the write destination) allocated to the writing volume 502 corresponding to the provision volume 501P.

The page 51Pa is the page 51 which is indirectly allocated to the page 51 which is allocated to the writing volume 502 corresponding to the provision volume 501P (that is, the provision volume 501P). The page (the page indirectly allocated to the provision volume 501P) allocated to the writing volume 502 is referred to as "writing page".

On the other hand, in a case where the write destination of the data set B of the write target is an invalid region, the storage controller 101 stores the uncompressed data set B to a page 51Pb which is allocated to the page of the write destination without compressing the data set B of the write target. The page 51Pb is the page 51 which is directly allocated (not through the writing volume 502) to the provision volume 501P. In the page 51 directly allocated to the provision volume 501P, overwriting is possible. Therefore, the page directly allocated to the provision volume 501P is referred to as "overwriting page".

Next, the writing onto a page will be described.

Figure 13:
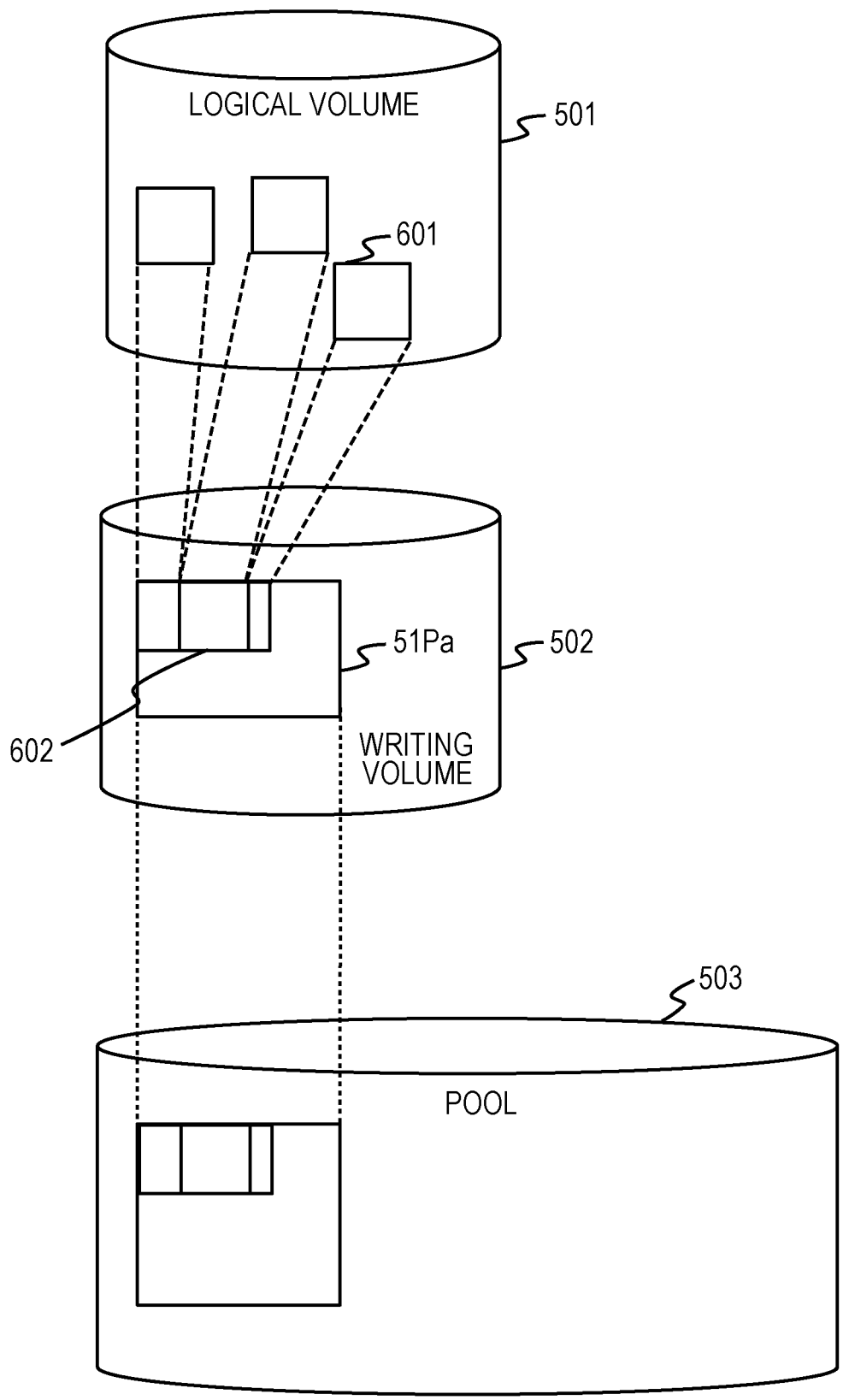
FIG. 13 is a diagram for describing writing onto a page according to an embodiment.

FIG. 13 is a diagram for describing the writing onto a page according to an embodiment.

The logical volume 501 is configured by a plurality of blocks 601 which is in a plurality of unit regions. In this embodiment, the data set is data in a unit of block.

In the page 51Pa allocated to the writing volume 502 corresponding to the logical volume 501, the data set after compression is written. Herein, the region occupied by the data set after compression in the page 51Pa is referred to as "sub-block 602". Further, in the page 51Pa, an uncompressed data set may be written. However, in this embodiment, the description will be given about that the data set after compression is written. In the pool 503, the state of the page 51Pa is reflected.

Next, a deduplication process will be described.

FIGS. 14A and 14B are diagrams for describing the deduplication process according to an embodiment. FIG. 14A illustrates an example of the state before the deduplication process, and FIG. 14B illustrates the state after the deduplication process.

As illustrated in FIGS. 14A and 14B, there are the provision volume 501P and the common volume 501C as the logical volume 501. The common volume 501C is a logical volume which belongs to the common region 80 and is not provided to the server system 201. In FIGS. 14A and 14B, at least a part of the common volume 501C is a valid region. Further, there may be provided with a common volume which is entirely a valid region, and a common volume which is entirely an invalid region.

In addition, in the storage system 200, the address conversion table 422 (422P or 422C) and the writing volume 502 (502P or 502C) are provided for each logical volume 501.

In the following description, the address conversion table 422 corresponding to the logical volume #m (a logical volume in which VOL # indicates "m" (m is an integer of 0 or higher)) is referred to as "address conversion table #m".

In addition, in the following description, the writing volume 502 corresponding to the logical volume #m may be referred to as "writing volume #m".

In addition, in the following description, the following terminologies may be used.

Provision block: Block in the provision volume.
Common block: Block in the common volume.
Duplication destination block: Common block used as the write destination (copy destination) of the duplication data set.
Writing independent page: Page which is an independent page and a writing page.
Writing common page: Page which is a common page and a writing page (that is, a page allocated to the writing volume corresponding to the common volume).

In the storage system 200, there are the provision volumes #1 and #2, and thus there are the address conversion tables #1 and #2 and the writing volumes #1 and #2 respectively corresponding. In addition, since there is the common volume #3, there are an address conversion table #3 and a writing volume #3. In the storage system 200, the writing volumes #1 and #2 belong to the independent region 70, and the writing volume #3 belongs to the common region 80.

Before the deduplication process, as illustrated in (A), there is the data set A in each of two provision blocks 601P of the provision volumes #1 and #2. As a result, the compressed data set A' (a sub-block 602P) in each of two writing independent pages (the independent pages 51P) respectively allocated to the writing volumes #1 and #2.

In each of the address conversion tables #1 and #2, the reference destination of the logical address of the provision block (the provision block 601P) of the write destination of the data set A becomes the logical address of the sub-block 602P in the writing independent page 51P.

Hereinafter, a processing operation in the deduplication process will be described.

Figure 15:
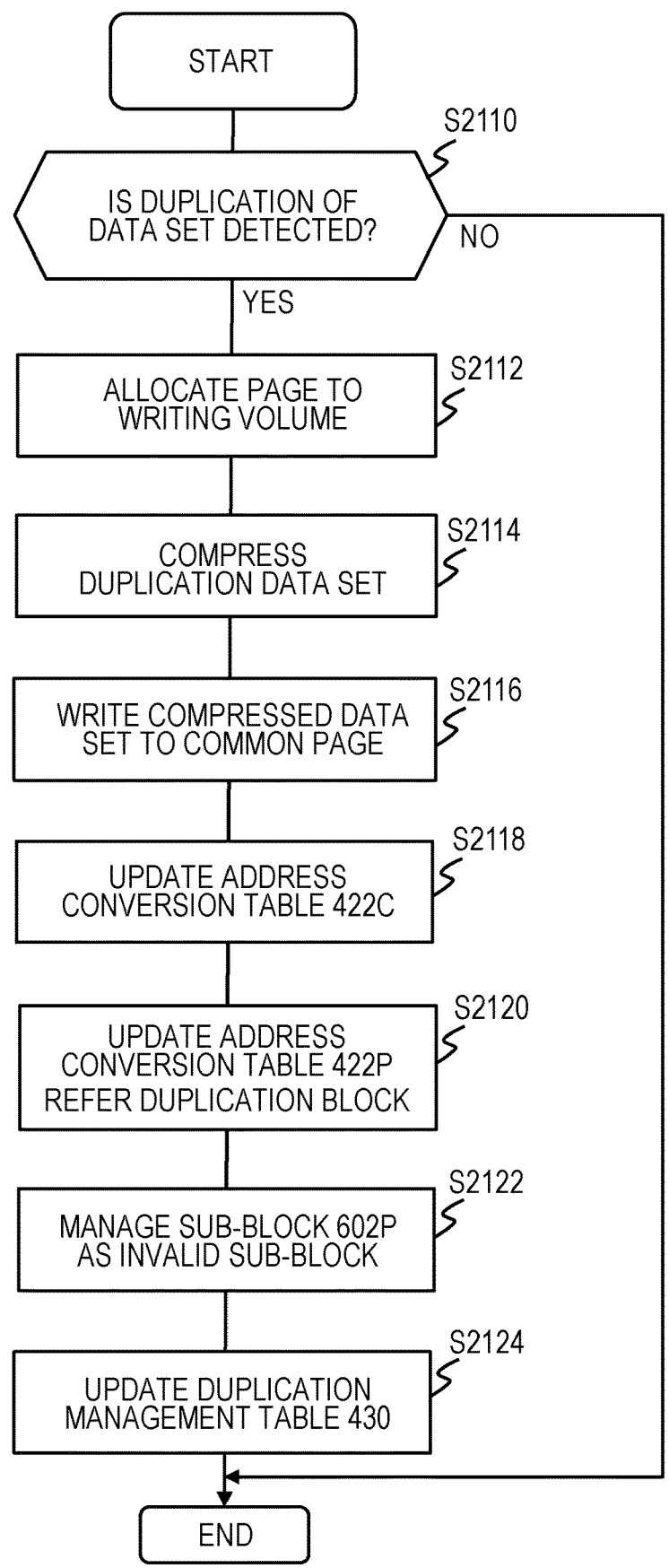
FIG. 15 is a flowchart of the deduplication process according to an embodiment.

FIG. 15 is a flowchart of the deduplication process according to an embodiment. Further, FIG. 15 will be described with reference to FIG. 14B.

The storage controller 101 determines whether it is detected that there is a data set (duplication data set) duplicated among the plurality of provision volumes 501P (S2110). As a result, in a case where it is not detected that there is a duplicated data set (S2110: not detected), the deduplication process ends.

On the other hand, in a case where it is detected that there is a duplicated data set (S2110: detected), the storage controller 101 copies the duplicated data set (corresponding to, herein, the data set obtained after expanding the compressed data set) from the provision block 601P of an independent region 70 in the provision volume to any unused common block 601C in the valid region of the common volume 501C. The common block 601C of the copy destination is a duplication destination block. Next, the storage controller 101 allocates a page to the writing volume 502C corresponding to the duplication destination block (the common block 601C) (S2112). The allocated page is the writing common page (the common page 51C). For example, in the example of FIGS. 14A and 14B, in S2112, it is detected that there is a duplication data set A in the provision volumes #1 and #2, and a page to store a duplication data set A (corresponding to the data set after expanding the compressed data set A') is changed from a page of the provision block 601P of the valid region in the provision volumes #1 and #2 to the common page of any unused common block 601C in the valid region of the common volume #3.

Next, the storage controller 101 compresses the duplication data set (S2114), and writes the data set after compression (the compressed data set) to the writing common page (S2116). For example, in the example of FIG. 14B, the storage controller 101 compresses the duplication data set A in S2114, and writes the compressed data set A' in the writing common page in S2116.

Next, the storage controller 101 updates an address conversion table 422C (S2118). The storage controller 101 updates the reference destination of the logical address of the duplication destination block (the common block 601C) in the address conversion table 422C to the logical address of a sub-block 602C (the sub-block 602C where the compressed data set exists) in the writing common page (the common page 51C). For example, in the example of FIG. 14B, the storage controller 101 sets the reference destination of the logical address of the duplication destination block (the common block 601C) in the address conversion table #3 to the logical address of the sub-block 602C where the compressed data set A' in the common page 51C exists.

Next, the storage controller 101 updates an address conversion table 422P (S2120). The storage controller 101 sets the reference destination of the logical address of the provision block 601P in the address conversion table 422C to the logical address of the duplication destination block instead of the logical address of the sub-block 602P (the sub-block 602P where the compressed data set exists) in the writing independent page. For example, in the example of FIG. 14B, the storage controller 101 sets the reference destination of the logical address of the provision block 601P in the address conversion tables #1 and #3 to the logical address of the sub-block 602C where the compressed data set A' in the common page 51C exists.

Next, the storage controller 101 manages the sub-block 602P with the compressed data set stored among each of two writing independent pages allocated to the writing volume 502P as an invalid sub-block (Unallocated) as depicted with a dotted line (S2122). In the example of FIG. 14B, the sub-blocks 602P in the writing volumes #1 and #3 are set to the invalid sub-block.

Next, the storage controller 101 updates the duplication management table 430 (S2124). The storage controller 101 sets the reference source of the logical address of the duplication destination block (the common block 601C) in the duplication management table 430 to the logical addresses of two provision blocks 601P of the copy source.

Further, in the above-described deduplication process, the storage controller 101 may write any compressed data set to the common page 51C belonging to the common region 80 instead of copying the duplication data set to the common block 601C. Then, the storage controller 101 may set the reference destinations of the logical addresses of two provision blocks 601P to the logical address of the sub-block 602C of a copy destination page (the common page 51C), and may set the sub-block 602P of the copy source as the invalid sub-block. In such a case, the common volume 501C may be not employed.

In addition, in a case where the storage controller 101 copies the duplication data set to the common block 601C, the storage region of the cache memory 402 may be allocated as the storage region of the common block 601C.

Next, a volume copy process will be described. Herein, the description will be given on an assumption that the volume of the copy destination becomes a valid region.

Further, in the following description, the compression and the expansion of the data set may be performed by the data amount reduction program 414 (more accurately, the processor 211 which performs the data amount reduction program 414).

For example, the volume copy process is performed in a case where a volume copy request designating any provision volume 501P is received.

The volume copy control program 418 (accurately, the processor 211 which performs the volume copy control program 418) creates the writing volume 502S corresponding to the provision volume 501S of the copy destination, adds a new entry to the VOL management table 421, sets the number of the writing volume 502S of the copy destination to VOL #801 of the entry, sets "Writing" to the VOL attribute 802, sets the capacity of the created writing volume 502S to the VOL capacity 803, sets the number of a pool allocated to the writing volume 502S to pool #804, and sets "Valid" to the valid flag 805.

Next, the volume copy control program 418 associates and stores the number of the provision volume 501P of the copy source and the number of the provision volume 501S of the copy destination in a snapshot management table (not illustrated) so as to register the provision volumes 501P and 501S as the snapshot pair.

Further, if the volume is set to the valid region, a processing performance is degraded as the deduplication process is performed. Therefore, in a case where the processing performance is set important, the volume may be set to an invalid region. In that case, the provision volume of the copy source may be set to an invalid region, and the volume of the copy destination may be set to a valid region. Further, the copying of the volume can be performed over several generations.

Next, the description will be given with reference to FIGS. 16 to 20 about an example that the provision volume is copied in a case where the provision volume of the copy source is an invalid region, and the provision volume of the copy destination is a valid region. Further, this example relates to a method of employing a COW system of the snapshot.

Figure 16:
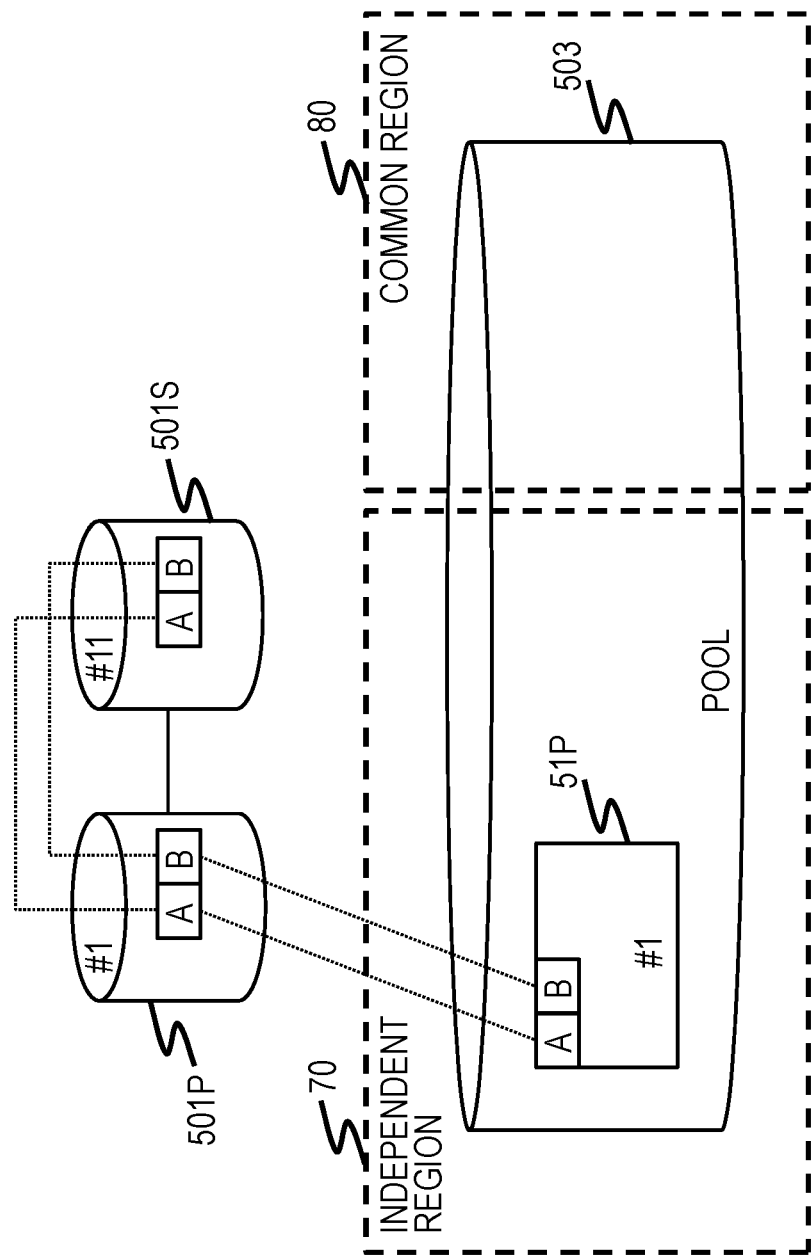
FIG. 16 is a diagram for describing a copying of a volume pair according to an embodiment.

FIG. 16 is a diagram for describing a copying of a volume pair according to an embodiment.

Herein, if the provision volume #1 of the copy source has an independent data set A and an independent data set B before copying, a volume #11 of the copy destination of the provision volume #1 refers the independent data set A and the independent data set B of the provision volume #1 after copying.

In other words, after copying the provision volume #1, the independent data set A and the independent data set B existing in the independent region 70 are referred from the provision volume #1, and indirectly referred from the provision volume #11 through the logical address of the provision volume #1.

For example, in the address conversion table 422 of the provision volume #11, at the entry corresponding to the region where the data set A is stored (that is, the entry where the in-volume address of the region is stored in the in-VOL address 901), the number of the provision volume #1 is stored in the reference destination VOL #902, the in-volume address stored with the data set A of the provision volume #1 is stored in the reference destination in-VOL address 903, a value (for example, −1) indicating "invalid" is stored in the data size 904 since the provision volume #1 of the copy source is an invalid region, and the VOL attribute of the provision volume #1 is stored in the reference destination VOL type 905. Further, the address conversion table 422 is similarly updated for the data set B.

The data set A and the data set B (the independent data set referred only from the provision volume #1) before copying become a common data set referred from the provision volume #1 and the provision volume #11 after copying. However, the data set A and the data set B are the duplication data set, but exist in the independent region 70 without being in the common region 80. Therefore, the independent page existing in the independent region 70 before copying does not become the common page after copying. Herein, the independent page for storing the duplication data set while being in the independent region 70 will be called "duplication independent page".

Next, the description will be given about the write process in the case of receiving a write request for writing another data set to the data set of the provision volume of the copy source (invalid region) when the pair after copying becomes the suspend state.

Figure 18:
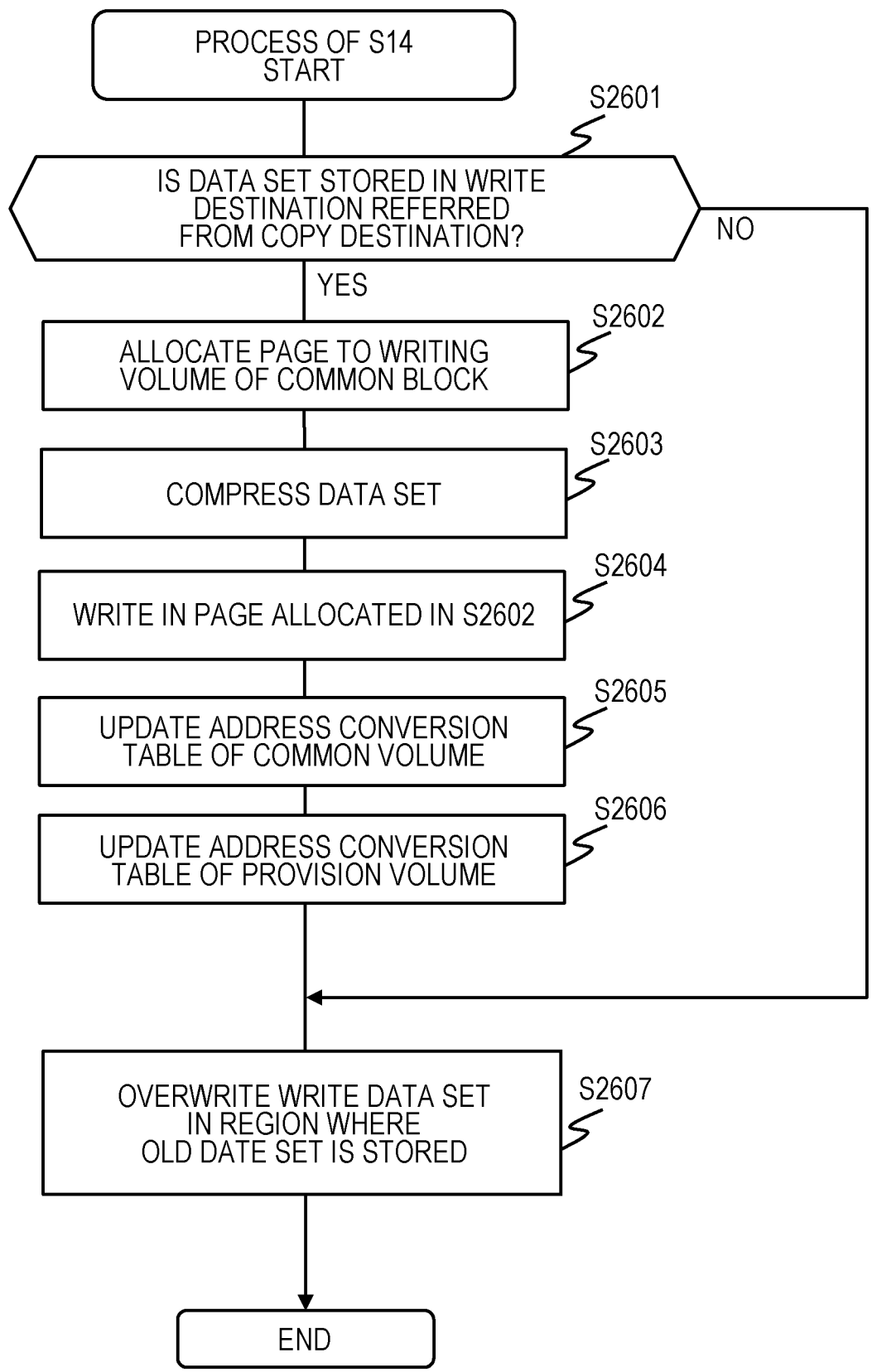
FIG. 18 is a flowchart of a function invalid copy source volume write process according to an embodiment.

FIG. 18 is a flowchart of the function invalid copy source volume write process according to an embodiment. FIG. 18 illustrates a process corresponding to Step S14 of FIG. 1.

The storage controller 101 (specifically, a processor 221 which performs the volume copy control program 418) determines whether the data set (old data set) stored in the write destination of the write request is referred from another copy destination (a volume of the copy destination) (S2601). As a method of determining whether the data set is referred, if the entry corresponding to the provision volume (a target of the VOL management table 421) is referred to find that "PVOL" is registered in the VOL type 806 of the entry, it can be specified that the copy of the provision volume is created. In a case where it is possible to specify that the copy is created, VOL # of the volume of the copy destination is retrieved from the snapshot management table (not illustrated). In a case where VOL # of the provision volume of the copy source is set in the reference destination VOL #902 in the address conversion table 422 corresponding to the volume of the retrieved VOL #, it is determined that the data set is referred from another copy destination. As another method, a bit map is stored which includes a bit corresponding to VOL # and each in-VOL address in the volume, and each bit is set to a value indicating whether the region of the corresponding in-VOL address is referred from another copy destination, so that it is possible to determine whether the data set is referred by referring the bit map.

As a result of the determination, in a case where it is determined that the data set is not referred from another copy destination (S2601: No), the storage controller 101 makes the process proceed to Step S2607.

On the other hand, in a case where the data set is referred from another copy source (S2601: Yes), the old data set is referred from another provision volume. Therefore, the old data set is necessarily evacuated and copied to a newly secured page in the common region 80 before the provision volume of the copy source is updated to the data set (write data set) of the write target. Herein, the volume of the copy destination is a valid region, and thus copied to the common region 80. The storage controller 101 allocates a page to the writing volume 602C corresponding to the common block 601C (S2602).

Next, the storage controller 101 reads and compresses the old data set (S2603), and writes the compressed data set in the writing common page (S2604).

The storage controller 101 updates the address conversion table 422 of the common volume 501C (S2605). Specifically, the storage controller 101 sets VOL # of the writing volume 502C to the reference destination VOL #902 at the entry corresponding to the logical address of the common block 601C of the address conversion table 422, and sets the logical address of the sub-block 602C (the sub-block 602C where the compressed data set exists) in the writing common page (the common page 51C) to the reference destination in-VOL address 903.

Next, the storage controller 101 updates the address conversion table of the provision volume 501S (S2606). In other words, the storage controller 101 updates the reference destination of the logical address of the provision block 601P of the address conversion table 422 to the logical address of the common block 601C instead of the logical address of the sub-block 602P (the sub-block 602P where the compressed data set exists) in the writing independent page. Specifically, the storage controller 101 sets VOL # of the common volume 501C to the reference destination VOL #902 of the entry corresponding to the logical address of the provision block 601P of the address conversion table 422, and sets the logical address of the common block 601C to the reference destination in-VOL address 903.

In Step S2607, the write data set is overwritten to update the write target region of the page of the independent region 70 of the provision volume 501P (S2607), and the process ends.

In Step S2607, in a case where the size of the data set requested for writing is smaller than the size (block) managed by the provision volume, the block containing the target position of the write request is once read. In a case where the block is compressed, the expanding is performed, the write data is overwritten to a target portion of the block, and then the entire block is compressed again.

Further, thereafter, if the duplication determination process illustrated in FIG. 15 is performed, and the common block is duplicated with a block of another provision volume, the duplication management table 430 is updated. In this case, in the duplication management table 430, the reference source of the logical address of the duplication destination block (the common block 601C) is updated to the logical addresses of two provision blocks 601P of the copy source.

Next, the description will be given about a specific example of the write process in the case of receiving the write request for writing another data set E to the data set A of the provision volume of the copy source (invalid region) when the pair after copying is in the suspend state as illustrated in FIG. 16.

Figure 17:
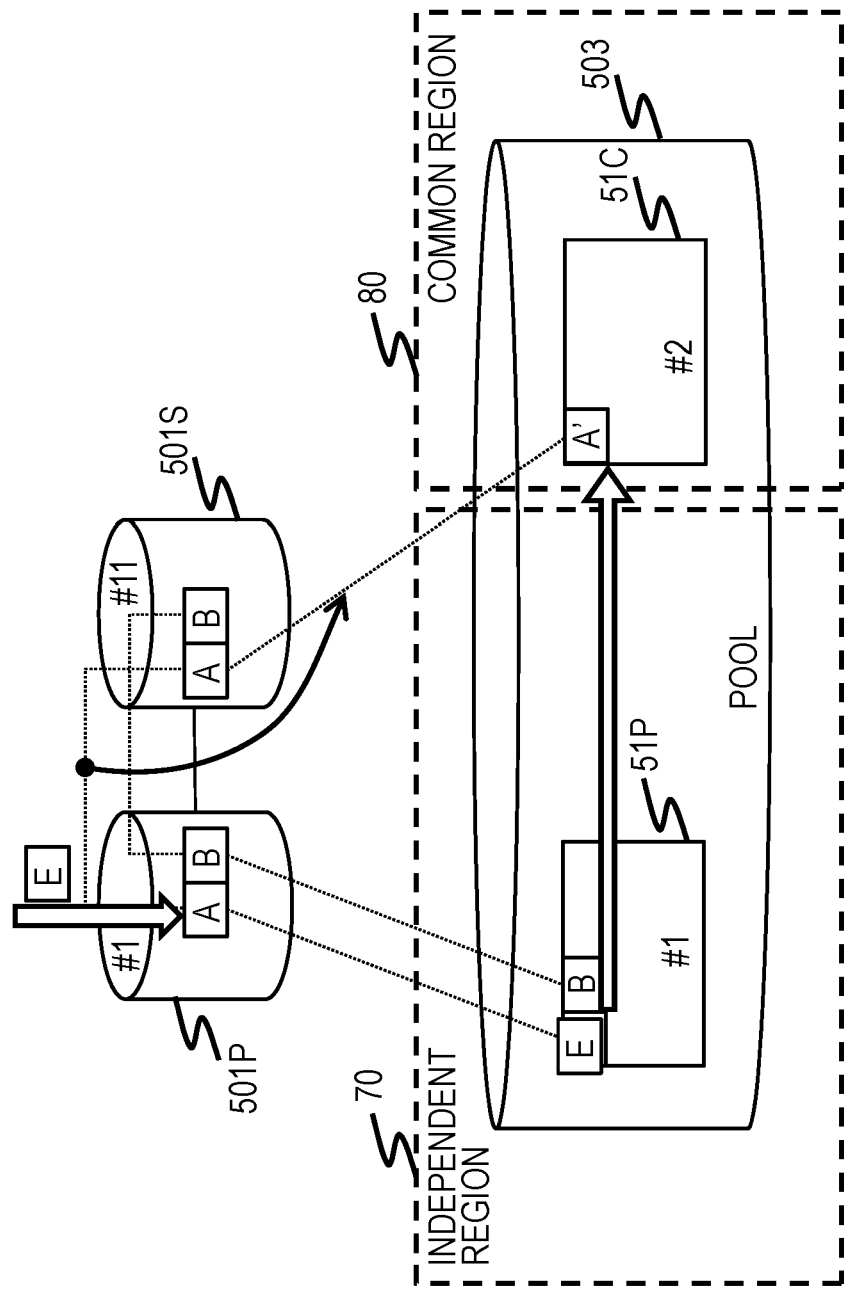
FIG. 17 is a diagram for describing a write process to a copy source volume when the volume pair according to an embodiment is in a suspend state.

FIG. 17 is a diagram for describing the write process to the copy source volume when the volume pair according to an embodiment is in the suspend state. Further, the description will be given with reference to FIG. 16.

In Step S2601 of the function invalid copy source volume write process, the data set A is referred from the provision volume #11 different from the provision volume #1, and thus the process proceeds to Step S2602. The data set A is referred from the provision volume #11. Therefore, the data set A is necessarily evacuated and copied to the page #2 which is newly secured in the common region 80 before the independent data set A of the provision volume #1 is updated. The provision volume #11 of the copy destination is a valid region, and thus is copied to the common region 80.

In Step S2602, the storage controller 101 allocates a page to the writing volume #3 corresponding to the common block 601C. The allocated page is a writing common page (the common page 51C). In Step S2603, the storage controller 101 reads and compresses the data set A and, in Step S2604, the compressed data set A' is written to the writing common page.

In Step S2605, the storage controller 101 updates the address conversion table #3 and, in Step S2606, the address conversion table of the provision volume #11 is updated. In Step S2607, after the data set A is evacuated and copied to the common block, the storage controller 101 overwrites and updates the data set E to the region where the independent data set A of the page #1 of the independent region 70 of the provision volume #1 is stored.

As a result, the provision volume #1 can provide the data set E after updating to the server system 201, and the provision volume #11 can provide the old data set A to the server system 201 by expanding the compressed data set A'.

Next, the description will be given about the write process in the case of receiving a write request for writing another data set to the data set of the provision volume of the copy destination (valid region) when the pair after copying becomes the suspend state.

Figure 20:
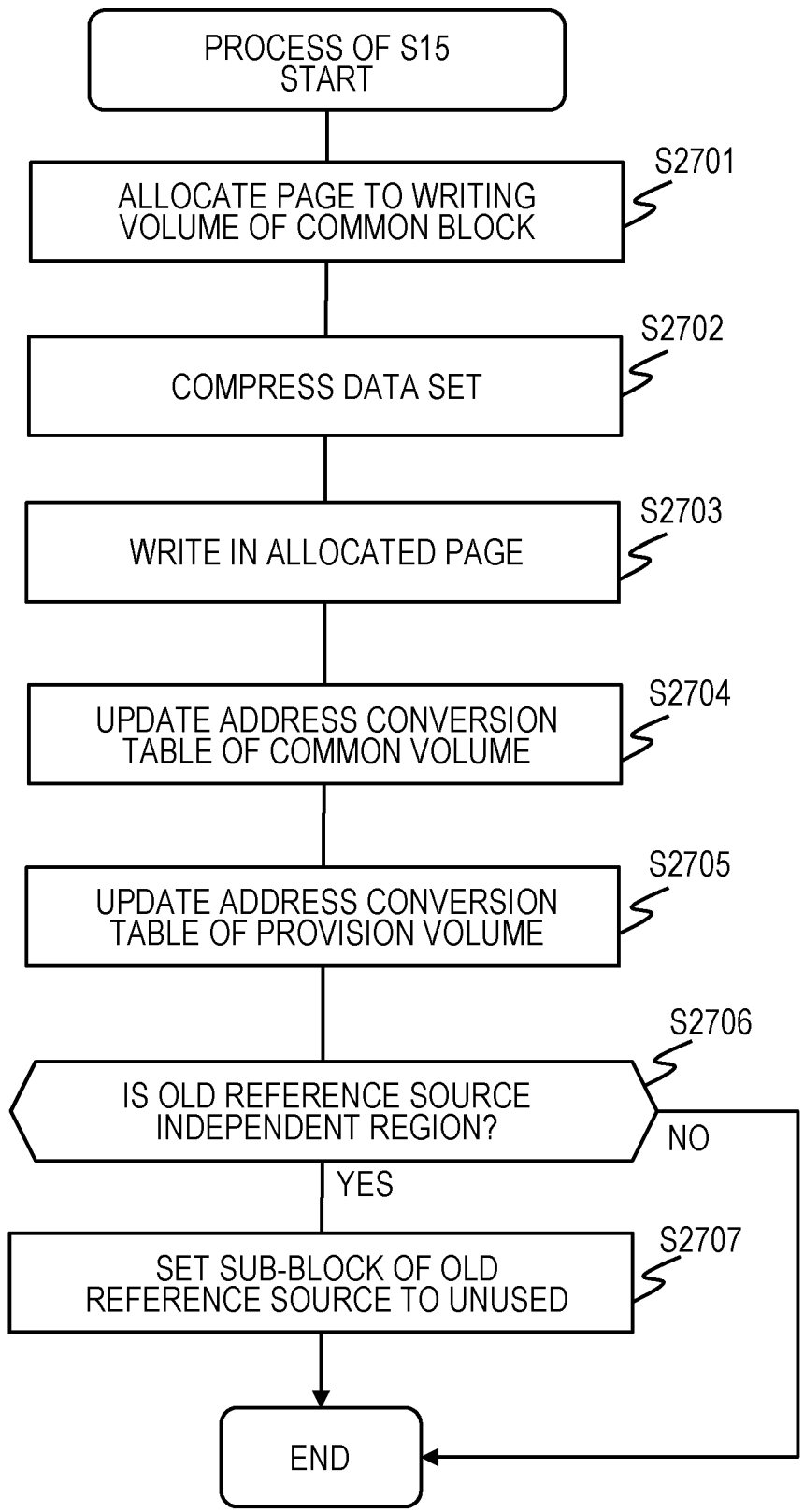
FIG. 20 is a flowchart of a function invalid copy destination volume write process according to an embodiment.

FIG. 20 is a flowchart of the function invalid copy destination volume write process according to an embodiment. FIG. 20 illustrates a process corresponding to Step S15 of FIG. 1.

Since the data set of the provision volume 501S refers the data set of the provision volume 501P, the storage controller 101 secures a region in the common page 51C of the common region 80 (S2701), compresses the data set (write data set) of the write target (S2702), and writes the data set after compression to the common page 51C of the common region 80 (S2703). At this time, the storage controller 101 writes the data set after compression to a region of an address after the common block which is used in the common page 51C.

In Step S2702, in a case where the size of the data set requested for writing is smaller than the size (block) managed by the provision volume, the block containing the target position of the write request is once read. In a case where the block is compressed, the expanding is performed, the write data is overwritten to a target portion of the block, and then the entire block is compressed again.

Next, in a case where there is an access to the target region of the write request, the storage controller 101 updates an address conversion table 422 of the common volume 501C so as to refer the data set after compression which is written in the common page 51C (S2704). Further, the updating of the address conversion table 422 is similar to S2605, and the details thereof will be omitted.

Next, the storage controller 101 updates the address conversion table 422 of the provision volume 501S (S2705). Specifically, the storage controller 101 sets VOL # of the common volume 501C to the reference destination VOL #902 of the entry corresponding to the logical address of the provision block 601S of the target region of the write request of the address conversion table 422, and sets the logical address of the common block 601C to the reference destination in-VOL address 903.

Next, the storage controller 101 (in detail, the processor 221 which performs the data amount reduction program 414) determines whether the reference source (old reference source) of an old sub-block is the logical address of a write destination block (that is, whether the reference source is the independent region 70) (S2706). Herein, the "old sub-block" is a sub-block where the compressed data set before updating the compressed data set of the write data set is stored. In other words, in Step S2706, it is determined whether the write data set is a data set after updating the data set in the independent region 70, or a data set after updating the data set in the common region 80.

As a result, in a case where it is determined that the old reference source is the independent region 70 (S2706: Yes), the storage controller 101 does not use the old sub-block of the old reference source (S2707), and the process ends. On the other hand, in a case where it is determined that the old reference source is not the independent region 70 (S2706: No), the process ends.

Next, the description will be given about a specific example of the write process in the case of receiving the write request for writing another data set F to the data set B of the provision volume #11 of the copy destination (valid region) when the pair after copying is in the suspend state as illustrated in FIG. 18.

Figure 19:
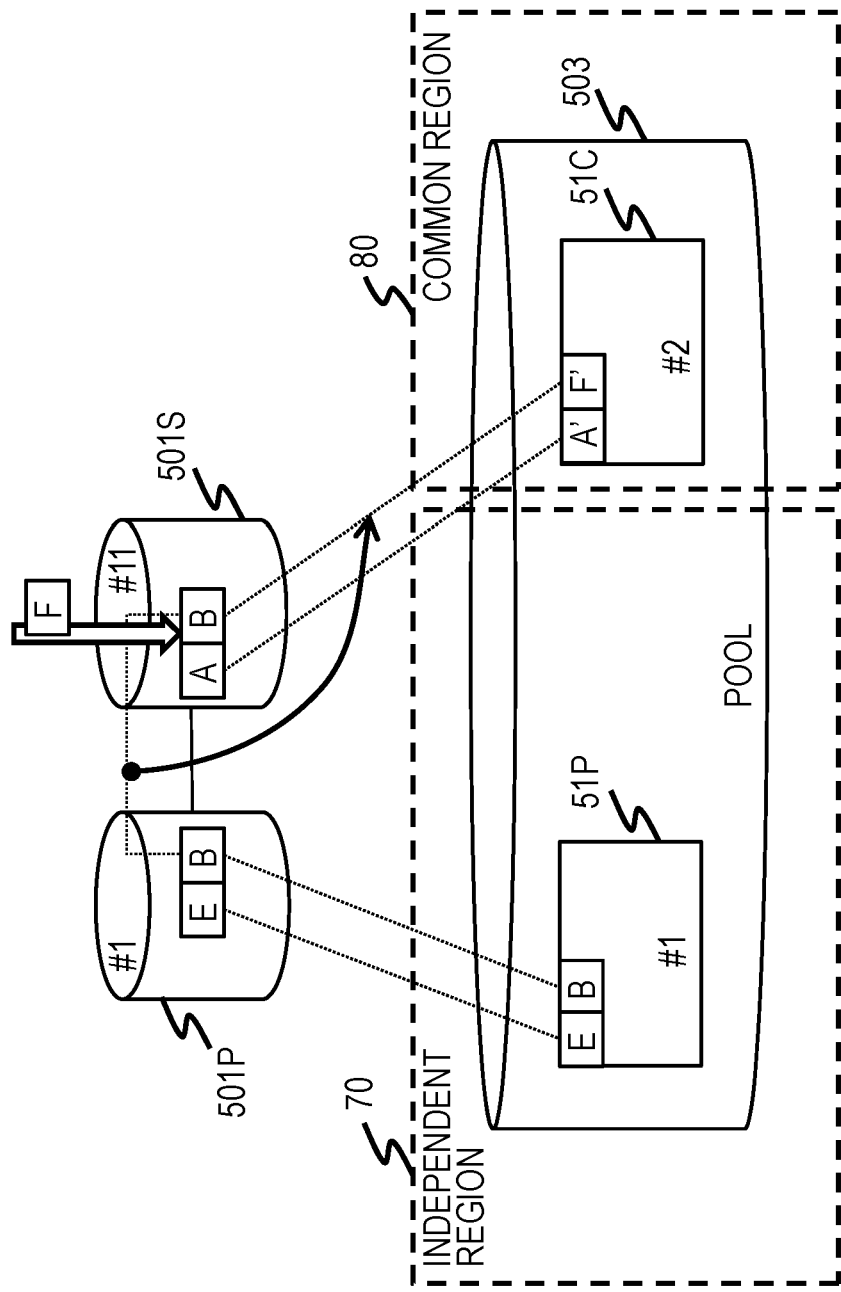
FIG. 19 is a diagram for describing a write process to a copy destination volume when the volume pair according to an embodiment is in the suspend state.

FIG. 19 is a diagram for describing a write process to the copy destination volume when the volume pair according to an embodiment is in the suspend state. Further, the description will be given with reference to FIG. 20.

In Step S2701 of the function invalid copy destination volume write process, the data set B of the provision volume #11 refers the data set B of the provision volume #1. Therefore, the storage controller 101 secures a region in the page #2 of the common region 80, compresses the data set F in S2702, and writes the data set F' after compression in the page #2 in S2703.

Next, the storage controller 101 updates the address conversion table of the common volume in S2704, and updates the address conversion table of the provision volume #11 in S2705. Next, the storage controller 101 determines that the old reference source is not the independent region 70 in S2706 (S2706: No), and the process ends.

Thereafter, in a case where the write request of the data set H is received with respect to the data set F of the provision volume #11, the storage controller 101 secures a new region of the page #2 of the common region 80, and compresses and stores the data set H.

Next, the description will be given with reference to FIGS. 21 to 23 about an example where the provision volume of the copy source is a valid region, the provision volume of the copy destination is also a valid region, and the provision volume is copied. Further, this example relates to a method of employing a ROW system of the snapshot.

Figure 21:
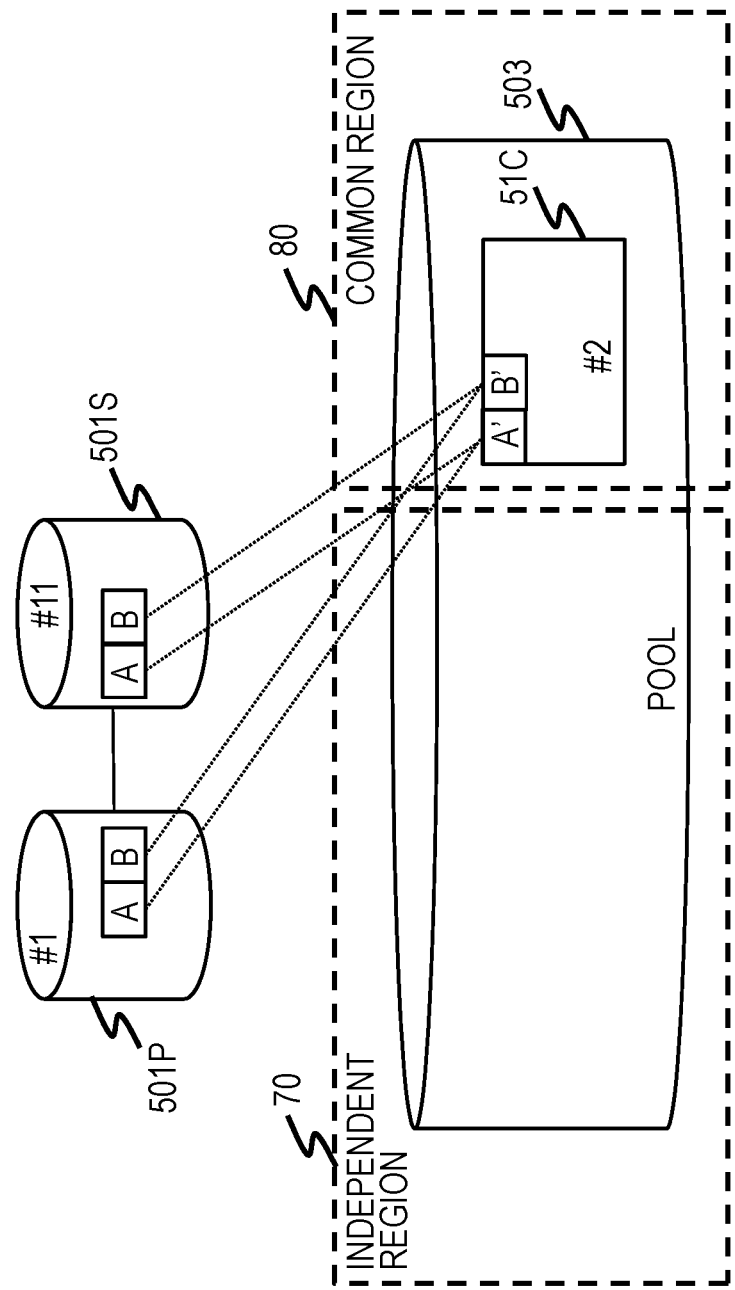
FIG. 21 is a diagram for describing a copying of the volume pair which is in a valid region according to an embodiment.

FIG. 21 is a diagram for describing a copying of the volume pair which is in the valid region according to an embodiment.

Herein, if the provision volume #1 of the copy source includes the independent data set A' (the data set obtained by compressing the data set A) which exists in the independent region 70 and the independent data set B' (the data set obtained by compressing the data set B) before copying, the volume #11 of the copy destination of the provision volume #1 also refers the independent data set A' and the independent data set B' after copying. Therefore, the page #2 of the common region 80 is secured, the independent data set A' and the independent data set B' are read out and expanded. The expanded data sets A and B are compressed, and are stored to the page #2 of the common region 80. As a result, the data set A' and the data set B' become the duplication data set.

In the address conversion table 422 of the provision volume #1, VOL # of the common volume 501C is stored in the reference destination VOL #902 at the entry corresponding to the region where the data sets (the data set A' and the data set B') are stored (that is, the entry where the in-volume address of the region is stored in the in-VOL address 901).

In the reference destination in-VOL address 903, the in-volume address stored with the data set is stored.

Next, the description will be given about the write process in the case of receiving a write request for writing another data set to the data set of the provision volume when the volume pair (valid region) after copying becomes the suspend state.

Figure 23:
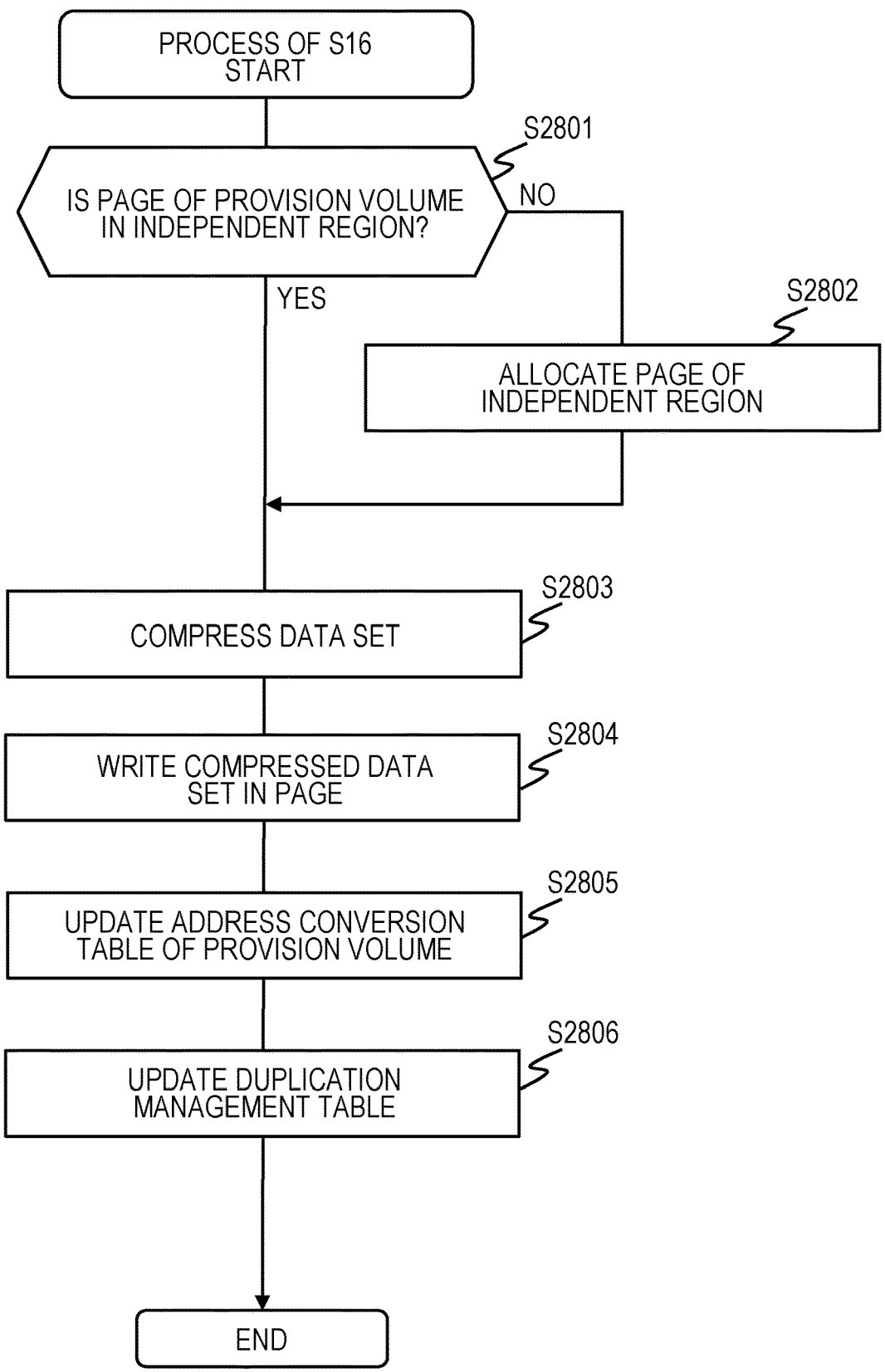
FIG. 23 is a flowchart of a function valid write process according to an embodiment.

FIG. 23 is a flowchart of the function valid write process according to an embodiment. FIG. 23 illustrates a process corresponding to Step S16 of FIG. 1.

The storage controller 101 determines whether there is a page to be used by the provision volume of the write target in the independent region 70 (S2801). Specifically, the storage controller 101 determines whether the reference source (old reference source) of the sub-block 602 (old sub-block) is the logical address of any provision block 601P in the provision volume 501 (501P and 501S). Herein, the "old sub-block" is a sub-block which stores the compressed data set (old compressed data set) before updating the compressed data set of the write target. The "compressed data set of the write target" is a compressed data set of the data set E of the write target to the provision block 601P of the write destination.

As a result, in a case where there is a page (S2801: Yes), the process proceeds to Step S2803. On the other hand, in a case where there is no page (2801: No), a new page is secured in the independent region 70, is allocated to the provision block 601P of the provision volume 501P (S2802), and the process proceeds to Step S2803.

Next, the storage controller 101 compresses the data set of the write target (S2803), and writes the data set after compression (compressed data set) to the new sub-block in the writing independent page (the independent page 51P) of the independent region 70 (S2804). Further, in a case where the size of the data set requested for writing is smaller than the size (block) managed by the provision volume when the data set is compressed, the block containing the target position of the write request is once read. In a case where the block is compressed, the expanding is performed, the write data is overwritten to a target portion of the block, and then the entire block is compressed again.

Next, the storage controller 101 changes the reference destination of the logical address of the provision block 601P of the write destination of the address conversion table 422 of the provision volume from the logical address of the duplication destination block to the logical address of the written sub-block (S2805). Specifically, the storage controller 101 stores VOL # of the writing volume 502 (502P and 502S) to the reference destination VOL #902 of the entry corresponding to the logical address of the provision block 601P of the write destination of the address conversion table 422 of the provision volume, and stores the in-volume address of the sub-block to the reference destination in-VOL address 903.

Next, the storage controller 101 updates the duplication management table 430 (S2806), and the process ends. Specifically, the storage controller 101 erases the entry 1402 corresponding to the sub-block from the duplication management table 430.

Next, the description will be given about the write process in the case of receiving a write request for writing another data set to the data set of the provision volume when the volume pair (valid region) after copying becomes the suspend state.

Figure 22:
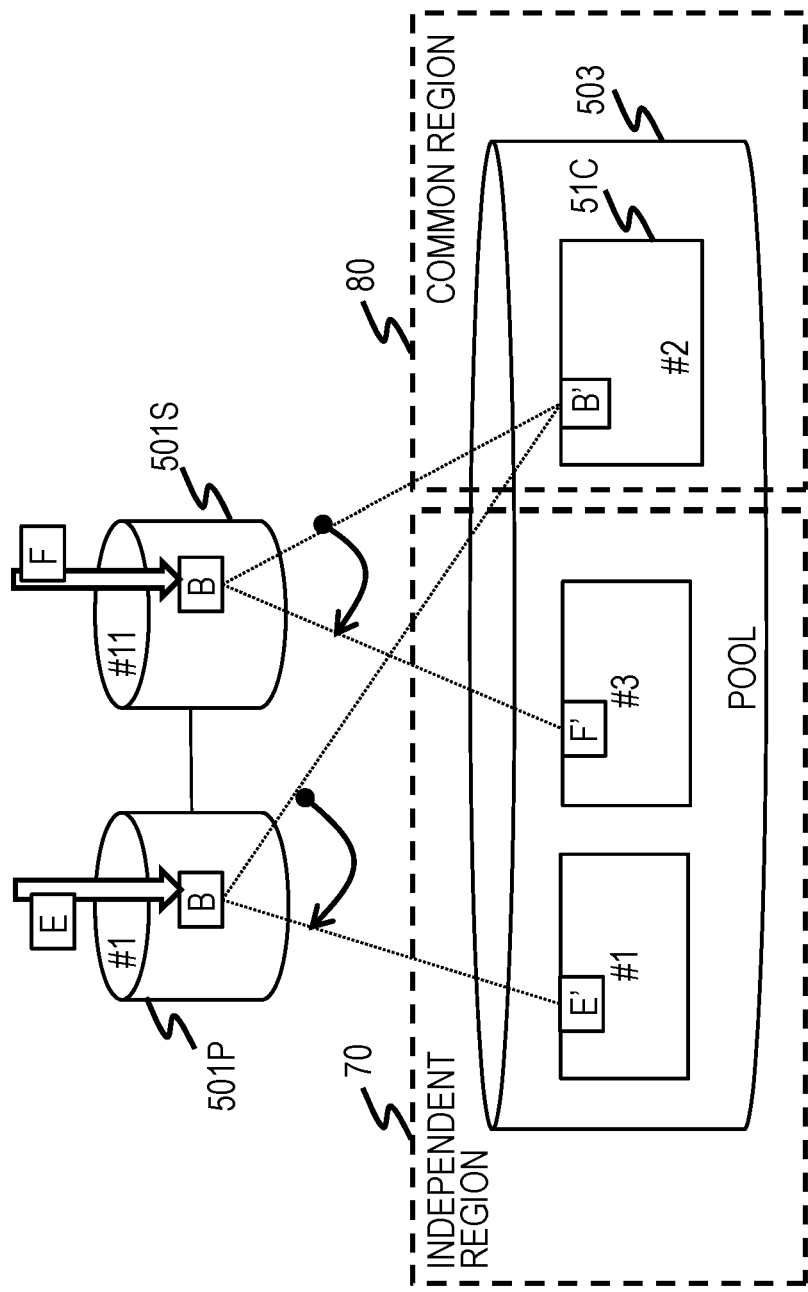
FIG. 22 is a diagram for describing a write process to the copy source volume and the copy destination volume when the volume pair in the valid region according to an embodiment is in the suspend state.

FIG. 22 is a diagram for describing a write process to the copy source volume and the copy destination volume when the volume pair in the valid region according to an embodiment is in the suspend state. Further, the description will be given with reference to FIG. 23.

Herein, the description will be given about a case where the storage controller 101 receives the write request in order to write the data set E to the provision block 601P of the write destination of the data set B in the provision volume #1.

The storage controller 101 determines whether the reference source (old reference source) of the sub-block 602 (old sub-block) is the logical address of any provision block 601P in the provision volume #1 with respect to the writing independent page (the independent page 51P) of the writing volume #1 corresponding to the provision volume #1.

In this example, in S2801, the storage controller 101 determines that there is a page to be used by the provision volume #1 in the independent region 70 (S2801: Yes), and the process proceeds to S2802.

Next, the storage controller 101 compresses the data set E of the write target in S2803, writes the compressed data set E' to a new sub-block in the writing independent page (the independent page 51P) in S2804, changes the reference destination of the logical address of the provision block 601P of the write destination from the logical address of the duplication destination block to the logical address of the new sub-block in S2805, and updates the duplication management table 430 of the duplication block in S2806.

Thereafter, if the write request of the data set F with respect to the data set B of the provision volume #11 is received, the storage controller 101 secures the new page #3 in order to be used by the provision volume #11 in the independent region 70. Next, the storage controller 101 compresses the data set F, and stores the data set to the secured page #3. Next, the storage controller 101 updates the address conversion table 422 of the provision volume #11 so as to refer the data set F.

As a result, the provision volume #1 can provide the data set E after updating to the server system 201 by expanding the compressed data set E', and the provision volume #11 can provide the data set F to the server system 201 by expanding the compressed data set F'.

For example, if the logical address of the valid compressed data set (the valid sub-block 602P) becomes discontinuous (that is, the valid compressed data set is dispersed) in the writing independent page, there may be performed a garbage collection on the independent region 70 to make the valid compressed data set continuous.

In addition, if the duplication destination block (the common block 601C) in the common volume 501C is kept in use regardless of not being referred from the provision block 601 (601P and 601S) in any provision volume 501 (501P and 501S) and, as a result, an empty capacity of the common volume 501C is not increased, and an unnecessary compressed data block remains in the common page 51C. In this case, the storage controller 101 may perform a releasing for making the duplication destination block unused.

The data amount reduction program 414 may perform the deduplication process on the target data set, for example, periodically or in a case where there is a request for data reduction. In addition, in a case where the selected data set is an independent data set and the deduplication is not made, the data amount reduction program 414 may perform a writing on the independent data set which is not subjected to the deduplication. In a case where the selected data set is a duplication data set and the deduplication is made, or after the writing, the data amount reduction program 414 may discard (for example, erase from the cache memory 402) the selected data set.

As described above, the method of the write process is different depending on whether the volume of the copy source is a valid region when the volume created by the snapshot is used. According to this embodiment, the volume can be created by the user using the snapshot without recognizing the attribute of whether the volume of the copy source is a valid region, and the created volume can be easily and appropriately used. In addition, a user's snapshot operation is unified, so that the operation becomes easy, and a user's load can be reduced. In addition, a snapshot volume of the volume of the valid region and the volume of the invalid region can be provided to the user, a variation of volume which can be used under a test environment required by the user can be increased, and a broad variety of data utilization method can be provided. With the configuration, it is possible to realize an improvement of service for the user as a whole.

Next, the description will be given about a read process which is performed in a case where the storage system 200 receives the read request from the server system 201.

Figure 24:
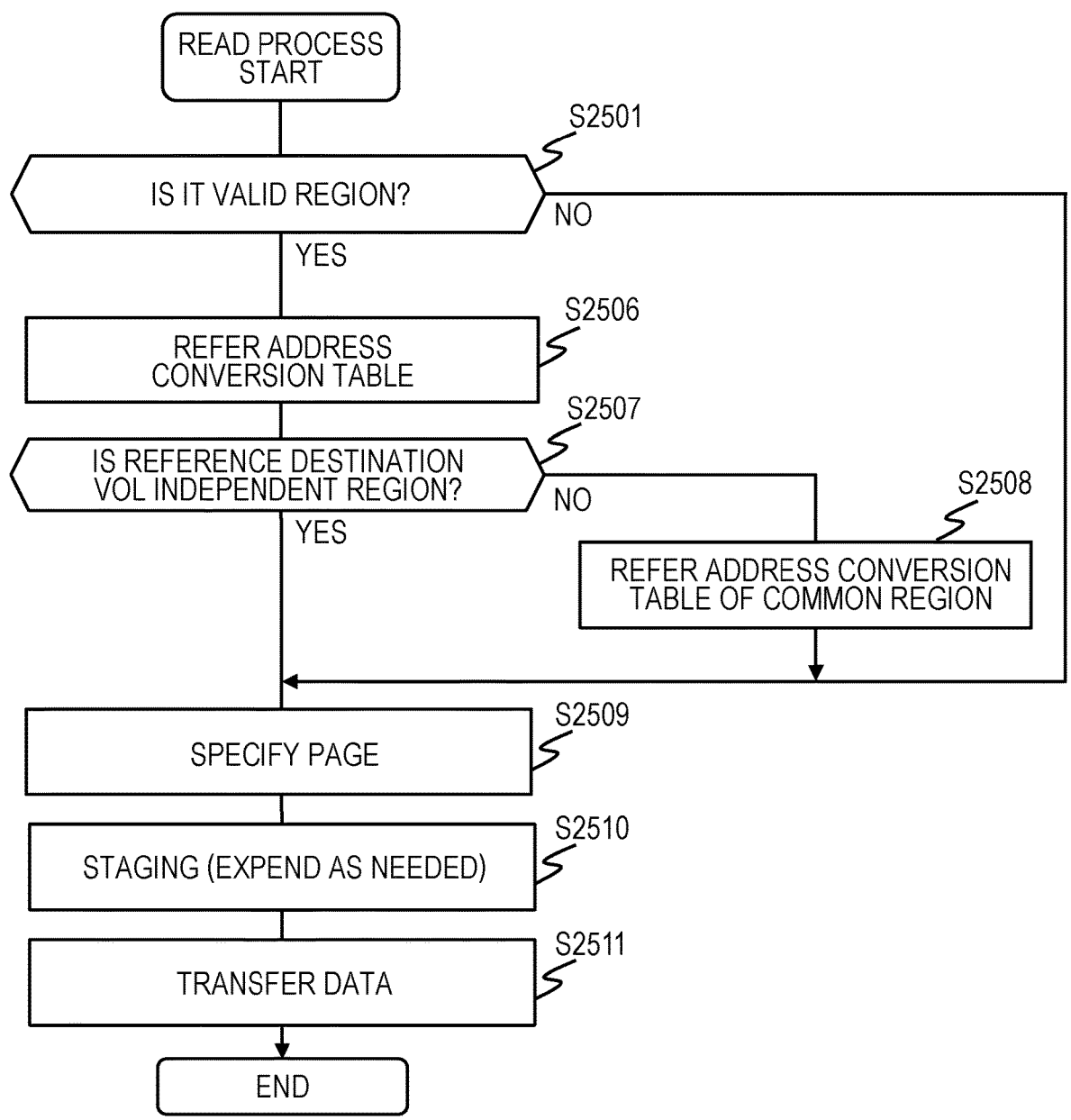
FIG. 24 is a flowchart of a read process according to an embodiment.

FIG. 24 is a flowchart of the read process according to an embodiment.

The read program 411 (accurately, the processor 211 which performs the read program 411) determines whether a read source according to the read request is a valid region on the basis of the VOL management table 421 (Step 2501). As a result, in a case where the determination result is true (that is, the read source is a valid region) (Step 2501: Yes), the read program 411 refers the address conversion table 422 corresponding to a specified volume (Step 2506).

Next, the read program 411 specifies each block of the specified volume on the basis of the address conversion table 422, and performs the following processes (S2507 to S2510) on each specified block. Herein, in the description of this flowchart, the block of a target will be called a target block.

First, the read program 411 determines whether the volume of the reference destination of the target block is an independent region (S2507). Specifically, the read program 411 determines whether the value of the reference destination VOL type 905 of the entry of the address conversion table 422 corresponding to the target block is "Independent".

In a case where the determination result of Step S2507 is false (that is, the volume of the reference destination is not an independent region) (S2507: No), the read program 411 refers the address conversion table 422 corresponding to the common volume 501C which is indicated by the reference destination VOL #902 of the entry corresponding to the target block and the value of the reference destination in-VOL address 903 (S2508), and the process proceeds to Step S2509.

On the other hand, in a case where the determination result of Step 2507 is true (that is, the volume of the reference destination is an independent region) (S2507: Yes), the process proceeds to Step S2509.

In a case where the volume of the reference destination is an independent region (S2507: Yes) or the process of Step 2508 is performed, the read program 411 specifies the page 51 corresponding to the target block on the basis of the page conversion table 425 (S2509), reads the compressed data set corresponding to the target block from the specified page 51, expands the compressed data set, and stores the expanded data set in the cache memory 402 (S2510).

In a case where the determination result of Step S2501 is true (S2501: YES), and if the process up to Step 2510 ends for each block of the volume of the read source, the data according to the read request is stored in the cache memory 402. Therefore, the read program 411 transfers the data stored in the cache memory 402 to an issuing source of the read request (S2511), and the process ends.

On the other hand, in a case where the determination result of Step S2501 is false (that is, a load source is not a valid region) (S2501: NO), the read program 411 specifies the page 51 allocated to the volume of the read source on the basis of the page conversion table 425 (S2509), reads data of the read target from the specified page 51 (S2510), transfers the read-out data to the issuing source of the read request (S2511), and the process ends.

Next, the deduplication process in the storage system 200 will be described in detail.

Figure 25:
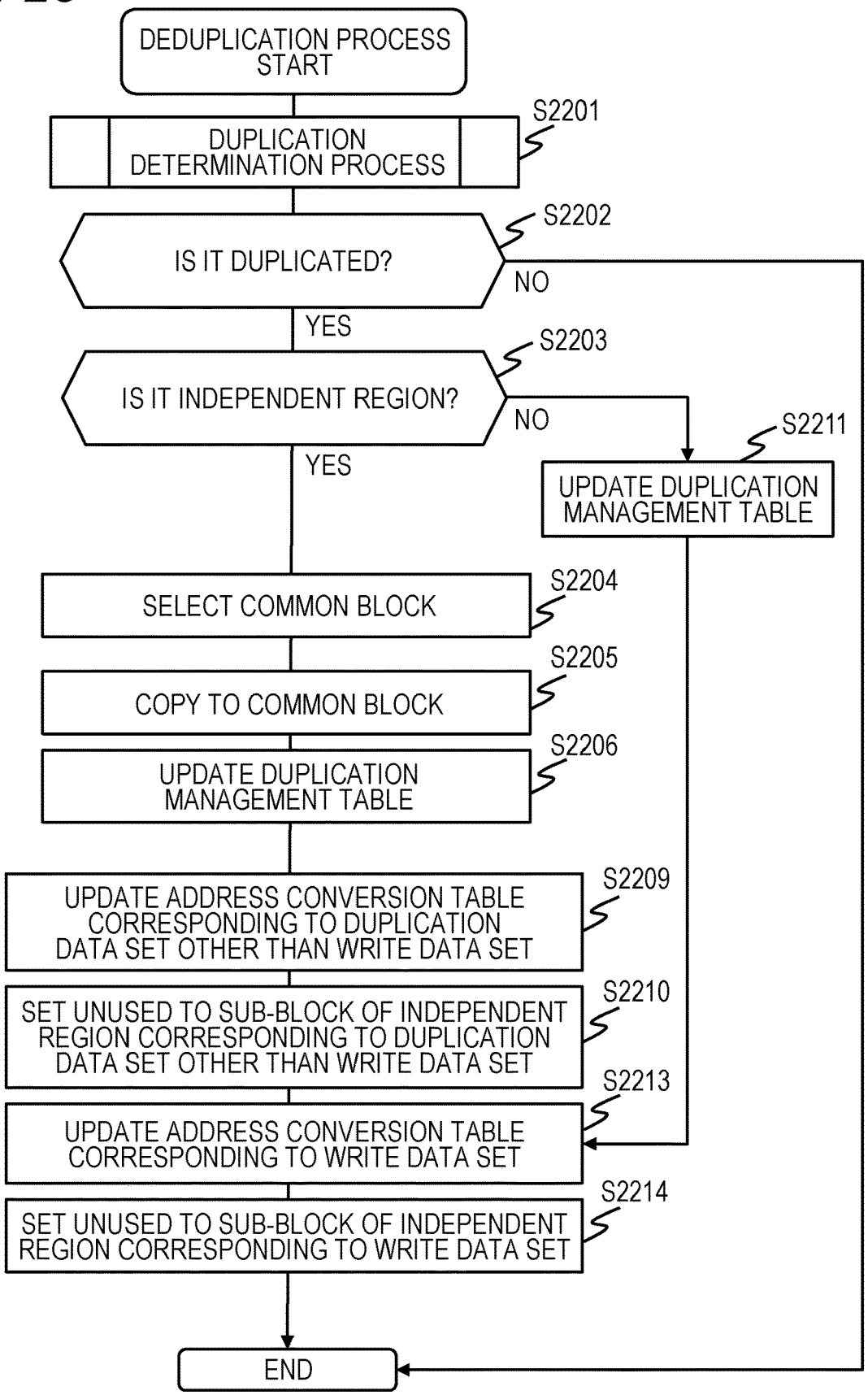
FIG. 25 is a flowchart of the deduplication process according to an embodiment.

FIG. 25 is a flowchart of the deduplication process according to an embodiment.

Herein, in the description of FIG. 25, the data set of the processing target of the deduplication process will be called "write data set", the block of the write destination of the write data set will be called "write destination block", and the logical volume contained in the write destination block will be called "write destination volume".

The data amount reduction program 414 (accurately, the processor 211 which performs the data amount reduction program 414) performs a duplication determination process to determine whether the write data set is duplicated with another data set (S2201). Further, the process of determining whether the data set is duplicated is a well-known technology, and the detailed description will be omitted herein.

Next, the data amount reduction program 414 determines whether the write data set is duplicated from the result of the duplication determination process (S2202). As a result, in a case where the write data set is a data set which is not duplicated (independent data set) (S2202: No), the data amount reduction program 414 ends the deduplication process on the data set of the processing target.

On the other hand, in a case where the write data set is a data set which is duplicated (duplication data set) (S2202: Yes), the data amount reduction program 414 determines whether there is another duplication data set which is duplicated with the write data set in the independent region 70 (Step 2203).

Herein, the target data of the duplication determination process is typically data of a predetermined processing target, and larger than the size of the block. Therefore, the duplication determination process may be performed in a unit of block (data set unit). However, in this embodiment, the process is collectively performed in a unit of data of the processing target instead of a unit of block. Specifically, for example, the data of the processing target is data according to the write request for any provision volume 501P. The size of the data according to the write request may be an integer multiple of the size of the block. The duplication determination process may be performed in a unit of data according to the write request (that is, a unit of I/O request). For example, the duplication determination process may be effectively performed when being performed in a unit of data of the processing target.

In addition, in the following description of FIG. 25, the write data set and another data set duplicating with the write data set will be collectively called "duplication data set". In other words, the "duplication data set" may be any one of two or more data sets containing the write data set.

Specifically, for example, the determination of Step S2203 may be performed on the basis of whether the VOL number of the VOL corresponding to the write destination block is matched to VOL # of VOL #801 of the entry where the VOL attribute 802 of the VOL management table 421 is "Provision", or whether the VOL attribute 802 is matched to VOL # of VOL #801 of the entry of "Common". If VOL # of VOL corresponding to the write destination block is matched to VOL # of VOL #801 of the entry where the VOL attribute 802 is "Provision", it indicates that the other duplication data set exists in the independent region 70. Therefore, the determination result in Step S2203 becomes true (YES). On the other hand, if the VOL number of VOL corresponding to the write destination block is matched to VOL # of VOL #801 of the entry where the VOL attribute 802 is "Common", it indicates that the other duplication data set exists in the common region 80. Therefore, the determination result of Step S2203 becomes false (NO).

In a case where the determination result of Step S2203 is true (S2203: YES), the data amount reduction program 414 refers a common region allocation management table 431, and selects the common block 601C where the in-use flag 1802 of the corresponding entry is "Unused" (S2204). In the following description, the common block 601C will be called "target common block", and the common volume 501C containing the target common block will be called "target common volume".

Next, the data amount reduction program 414 compresses the duplication data set, and writes the compressed data set in the common page 51C (the writing common page; particularly the target common block) which is allocated to the writing volume 502 corresponding to the target common volume (S2205).

Next, the data amount reduction program 414 updates the duplication management table 430 on the basis of the writing of the duplication data set (S2206). Specifically, the data amount reduction program 414 associates the entry 1402 indicating one or more blocks 601 corresponding to one or more duplication data sets (reference source) with respect to the address corresponding to the target common block of the duplication management table 430.

Next, the data amount reduction program 414 updates the address conversion table 422 corresponding to the provision volume 501P which stores the duplication data set other than the write data set (S2209). Specifically, the data amount reduction program 414 updates the reference destination VOL #902 of the entry corresponding to the region where the duplication data set of the address conversion table 422 is stored, and the reference destination in-VOL address 903 to the number of the target common volume and the logical address of the target common block, and changes the reference destination VOL type 905 to "Common".

Next, the data amount reduction program 414 updates the sub-block management table 427 related to the writing volume 502 corresponding to the provision volume 501P which stores the duplication data set other than the write data set (S2210). Specifically, the data amount reduction program 414 changes the allocation flag 1303 of the entry corresponding to the sub-block which stores the compressed data set of the duplication data set other than the write data set of the sub-block management table 427 to "Unallocated".

On the other hand, in a case where the determination result of Step S2203 is false (S2203: NO), the data amount reduction program 414 updates the duplication management table 430 (S2211). Specifically, in the duplication management table 430, the data amount reduction program 414 associates the entry 1402 indicating the write destination block to the address corresponding to the common block 601C where the duplication data set is stored.

After Step S2210 or Step S2211, the data amount reduction program 414 updates the address conversion table 422 corresponding to the write destination volume (S2213). Specifically, the data amount reduction program 414 changes the reference destination VOL #902 of the entry corresponding to the write destination block (write data set) of the address conversion table 422, and the reference destination in-VOL address 903 to the number of the common volume 501C and the logical address of the common block 601C, and changes the reference destination VOL type 905 to "Common".

Next, if the compressed data set of the write data set is a writing independent page, the data amount reduction program 414 updates the sub-block management table 427 related to the writing volume 502 corresponding to the write destination volume (S2214), and the process ends. Specifically, the data amount reduction program 414 changes the allocation flag 1303 of the entry corresponding to the sub-block which stores the compressed data set of the write data set to "Unallocated" in the sub-block management table 427.

The above-described deduplication process has been described as a post-process. However, for example, in a case where the deduplication process is performed as an in-process, the process of Step S2214 of FIG. 25 may be performed. This is because the deduplication is made without writing the compressed data set of the write data set, or without compressing the write data set.

As described above, according to the storage system 200 described in the above embodiment, it is possible to appropriately process I/O with respect to the volume even if the user does not recognize the attribute of the storage region of the volume related to the snapshot.

Further, the invention is not limited to the above-described embodiments, and can be implemented in various forms within a scope not departing from the spirit of the invention.

For example, in the above embodiment, the transferring source (I/O source) of the I/O request has been described as the server system 201, but the invention is not limited thereto. The I/O source may be a program (not illustrated; for example, an application program which is executed on a VM (Virtual Machine)) in the storage system 200.

In addition, in the above embodiment, the storing of data to the independent region 70 or the common region 80 may be performed in a unit of block (data set unit), or may be collectively performed in a unit (for example, a unit larger than the size of the block) of data of the processing target instead of a unit of block. Specifically, for example, the data of the processing target is data according to the write request for any provision volume 501P. The size of the data according to the write request may be an integer multiple of the size of the block. The storing of data to the independent region 70 or the common region 80 may be performed in a unit of data according to the write request (that is, a unit of I/O request). In this way, if the data is stored to the independent region 70 or the common region 80, the storing can be collectively performed in a unit of data of the processing target, so that it is efficient.

In addition, in the above embodiment, the compression process and the deduplication process are performed as the data amount reduction process, but the invention is not limited thereto. As the data amount reduction process, at least one of the compression process and the deduplication process may be performed.

In addition, in the above embodiment, a part or all of the processes performed by the processor may be performed by a hardware circuit. In addition, the program in the above embodiment may be installed from a program source. The program source may be a program distribution server or a storage media (for example, a portable storage media).

What is claimed is:

1. A volume management apparatus which stores a plurality of volumes and performs an input/output (I/O) process on the volumes, comprising:
a processor unit,
wherein the volumes include a first volume, and a second volume which is a volume copied from the first volume by a snapshot,
wherein the first volume refers to a physical storage region,
wherein, in a case where a write request is received, the processor unit determines whether a volume of a copy source related to a target volume of the write request is a volume where a storage region is a valid region to which a data amount reduction process is applied, and
wherein, depending on a case where the volume of the copy source is a volume of which the storage region is the valid region, or a case where the volume of the copy source is a volume of which the storage region is not the valid region, from a plurality of processes of creating the second volume related to the snapshot, a method of creating a process is selected and the selected method is performed.

2. The volume management apparatus according to claim 1,
wherein in the plurality of processes of creating the second volume related to the snapshot:
in a case where the first volume is a volume of which the storage region is an invalid region where the data amount reduction process is not applied, a page related to the snapshot in the first volume is referred to from the second volume, whereby the snapshot is created; and
in a case where the first volume is a volume of which the storage region is a valid region where the data amount reduction process is applied, the physical storage region which the first volume refers to based on the data amount reduction process is referred to from the second volume, whereby the snapshot is created.

3. The volume management apparatus according to claim 2,
wherein the first volume is a volume of which the storage region is an invalid region where the data amount reduction process is not applied,
wherein, in a case where the write request is a write request for the first volume, and a page allocated to a target region of the write request is referred from the second volume, the processor unit allocates a new page to a region of a reference source of the second volume, performs the data amount reduction process to an old data set stored in the target region of the write request of the first volume to store the old data set to the new page, and stores target write data of the write request in the page allocated to the target region of the write request, and
wherein, in a case where the write request is a write request for the first volume, and the page allocated to the target region of the write request is not referred from the second volume, the processor unit stores the target write data of the write request to the page allocated to the target region of the write request.

4. The volume management apparatus according to claim 3,
wherein the first volume is a volume of which the storage region is an invalid region where the data amount reduction process is not applied, and
wherein, in a case where the write request is a write request for the second volume, the processor unit allocates a new page to the target region of the write request for the second volume to perform the data amount reduction process on a target write data set of the write request, and stores the write data set to the new page.

5. The volume management apparatus according to claim 3,
wherein the first volume is a volume of which the storage region is an invalid region where the data amount reduction process is not applied, and
wherein, in a case where the second volume is created from the first volume by the snapshot, the processor unit generates reference information with which each region of the first volume corresponding to each region of the second volume can be referred.

6. The volume management apparatus according to claim 5,
wherein, in a case where a read request for the second volume is received, and a page allocated to a target region of the read request is referred from both of the first volume and the second volume, the processor unit reads target read data of the read request from the page, and transmits the read data to a request source of the read request without expanding the read data.

7. The volume management apparatus according to claim 2,
wherein the first volume is a volume of which the storage region is a valid region,
wherein, in a case where the write request is a write request for the first volume or the second volume, and a page allocated to a target region of the write request is referred from both of the first volume and the second volume, the processor unit allocates a new page to the target region of the write request of the first volume or the second volume which is a target of the write request, performs the data amount reduction process on a target write data set of the write request, and stores the write data set to the new page.

8. The volume management apparatus according to claim 7,
wherein the first volume is a volume which includes a valid region, and
wherein, in a case where the second volume is created from the first volume by the snapshot, the processor unit stores each data set stored in each region of the first volume to a third volume which can be referred from both of the first volume and the second volume.

9. The volume management apparatus according to claim 1,
wherein the data amount reduction process is at least one of a data compression process and a deduplication process.

10. A volume management method of a volume management apparatus which stores a plurality of volumes and performs an input/output (I/O) process on the volumes, wherein the volumes include a first volume and a second volume which is a volume copied from the first volume by a snapshot,
the method, comprising:
determining whether, in a case where a write request is received, a target volume of the write request is a volume of which a storage region is a valid region to which a data amount reduction process is applied; and
depending on a case where a target volume of the write request is a volume of which the storage region is the valid region or a case where the target volume of the write request is a volume of which the storage region is not the valid region, from a plurality of processes of creating the second volume related to the snapshot, selecting a method of creating a process and performing the selected method.

11. A non-transitory computer readable storage medium storing thereon a volume management program which is executed by a computer which forms a volume management apparatus which stores a plurality of volumes and performs an input/output (I/O) process on the volumes,
  wherein the volumes include a first volume and a second volume which is a volume copied from the first volume by a snapshot,
  the program, when executed by the computer, causes the computer to perform:
  determining whether, in a case where a write request is received, a target volume of the write request is a volume of which a storage region is a valid region for which a data amount reduction process is applied; and
  depending on a case where a target volume of the write request is a volume of which the storage region is the valid region or a case where the target volume of the write request is a volume of which the storage region is not the valid region, from a plurality of processes of creating the second volume related to the snapshot, selecting a method of creating a process and performing the selected method.

* * * * *